(12) United States Patent
Snook et al.

(10) Patent No.: US 8,126,828 B2
(45) Date of Patent: Feb. 28, 2012

(54) SPECIAL PURPOSE PROCESSOR IMPLEMENTING A SYNTHETIC NEURAL MODEL OF THE HUMAN BRAIN

(75) Inventors: James A. Snook, San Diego, CA (US); Donald B. Hutson, San Diego, CA (US); Jeffrey L. Krichmar, Cardiff-by-the-Sea, CA (US)

(73) Assignee: Neuroscience Research Foundation, Inc., San Diego, CA (US)

( * ) Notice: Subject to any disclaimer, the term of this patent is extended or adjusted under 35 U.S.C. 154(b) by 0 days.

(21) Appl. No.: 12/421,503

(22) Filed: Apr. 9, 2009

(65) Prior Publication Data
US 2009/0240642 A1 Sep. 24, 2009

Related U.S. Application Data

(63) Continuation of application No. 11/426,881, filed on Jun. 27, 2006, now Pat. No. 7,533,071.

(60) Provisional application No. 60/694,532, filed on Jun. 28, 2005.

(51) Int. Cl.
*G06F 15/18* (2006.01)
*G06G 7/00* (2006.01)
*G06N 3/04* (2006.01)
*G05B 13/02* (2006.01)

(52) U.S. Cl. ............... 706/27; 706/14; 706/23; 706/26; 706/41

(58) Field of Classification Search ............... 706/27
See application file for complete search history.

(56) References Cited

U.S. PATENT DOCUMENTS

| | | | |
|---|---|---|---|
| 4,095,367 A | 6/1978 | Ogawa | |
| 5,164,826 A | 11/1992 | Dailey | |
| 5,680,515 A | 10/1997 | Barhen | |
| 5,781,702 A | 7/1998 | Alhalabi | |
| 6,553,300 B2 | 4/2003 | Ma | |
| 6,882,992 B1 * | 4/2005 | Werbos | |
| 7,240,160 B1 * | 7/2007 | Hetherington et al. | |
| 7,430,643 B2 * | 9/2008 | Jordan et al. | |
| 2002/0123977 A1 | 9/2002 | Raz | |
| 2003/0033032 A1 | 2/2003 | Lind et al. | |
| 2004/0015079 A1 * | 1/2004 | Berger et al. | |
| 2004/0162638 A1 | 8/2004 | Solomon | |
| 2006/0041803 A1 * | 2/2006 | Woodward et al. | |

FOREIGN PATENT DOCUMENTS

DE 19718224 A1 * 11/1997

(Continued)

OTHER PUBLICATIONS

Yamada et al., Development of Large Scale Neural Network Processor Toward Brainway Computing, Apr. 1998.*

(Continued)

*Primary Examiner* — Jeffrey A Gaffin
*Assistant Examiner* — Nathan H Brown, Jr.
(74) *Attorney, Agent, or Firm* — Fliesler Meyer LLP

(57) ABSTRACT

A special purpose processor (SPP) for implementing a synthetic neural model of the biological anatomy of the human brain to control a brain-based device (BBD) that is movable in a real-world environment, including neural processing units (NPUs), each having a programmed processor and a local memory that stores data records of neural elements, a system memory for storing data about all the NPUs, and a finite state machine and a system bus for transferring data between the NPUs and system memory.

2 Claims, 28 Drawing Sheets

Neural Element Model

FOREIGN PATENT DOCUMENTS

| | | | |
|---|---|---|---|
| EP | 0834817 A | * | 4/1998 |
| EP | 1089221 A2 | | 4/2001 |
| EP | 1136325 A2 | * | 9/2001 |
| EP | 1510446 A2 | | 3/2005 |
| EP | 1552908 A1 | | 7/2005 |

OTHER PUBLICATIONS

Weng, Developmental Robotics: Theory and Experiments, Mar. 2004.*

Mumford et al. (Mumford), The Mod 2 Neurocomputer System Design [online], IEEE Transactions on Neural Networks, vol. 3, No. 3, May 1992 [retrieved on Dec. 9, 2010]. Internet:< URL: http://www.biomedsearch.com/nih/Mod-2-Neurocomputer-system-design/18276446.html>.*

International Search Report and Written Opinion dated Mar. 19, 2007 for International Application No. PCT/US06/25107, 6 pages.

International Search Report and Written Opinion dated Sep. 28, 2007 for International Application No. PCT/US06/35357, 7 pages.

International Search Report and Written Opinion dated Apr. 1, 2008 for International Application No. PCT/US06/25264 16 pages.

Halgamuge, et al., "Fuzzy Interpretable Dynamically Developing Neural Networks with FPGA Based Implementation," IEEE Proceedings of the Fourth International Conference on Microelectronics for Neural Networks and Fuzzy Systems, Sep. 26-28, 1994, pp. 226-234, Turin.

Miller, W.T., III, "Real-time Neural Network Control of a Biped Walking Robot," IEEE Control Systems Magazine, Feb. 1994, pp. 41-48, vol. 14, No. 1.

Glackin B. et al., A novel approach for the implementation of large scale spiking neural networks on FPGA hardware, Computation Intelligence and Bioinspired Systems, Lecture Notes in Computer Science, Jun. 1, 2005, pp. 552-563, vol. 3512, Springer-Verlag, Berlin/Heidelberg.*

Seth, A. Et al., Visual binding through reentrant connectivity and synchronization in a brain-based device, Cerebral Cortex, Nov. 2004, pp. 1185-1199, vol. 14, No. 11.*

Schoenauer, T. et al., Neuro-Pipe chip: a digital neur-processor for spiking neural networks, IEEE Transaction on Neural Networks, Jan. 1, 2002, pp. 205-213, vol. 13, No. 1, Piscataway, New Jersey.*

Zhu, J. Et al., Towards an FPGA based reconfigurable computing environment for neural network implementations, Artificial Neural Networks, 1999, ICANN 99—Ninth International Conference, Sep. 7-10, 1999, pp. 661-666, vol. 2, London.*

Hellmich H. Et al, An FPGA based simulation acceleration platform for spiking neural networks, IEEE International Midwest Symposium, Jul. 25, 2004, pp. II 389-II 392, vol. 2.*

Dietmar Jung et al., Synaptic plasticity in spiking neural networks (SP<2>INN): a system approach, IEEE Transactions on Neural Networks, Sep. 1, 2003, pp. 980-992, vol. 14, No. 5, Piscataway, New Jersey.

Krichmar, J. et al., "Machine psychology: Autonomous behavior, perceptual categorization and conditioning in a brain-based device," Cerebral Cortex, Aug. 2002, vol. 12, No. 8, pp. 818-830.

Roggen, D. et al., "Hardware spiking neural network with run-time reconfigurable connectivity in an autonomous robot," Evolvable Hardware, 2003, Proceedings. NASA/DOD Conference on Jul. 9-11, 2003, Piscataway, New Jersey, Jul. 9, 2003, pp. 199-208.

* cited by examiner

Neural Element Model

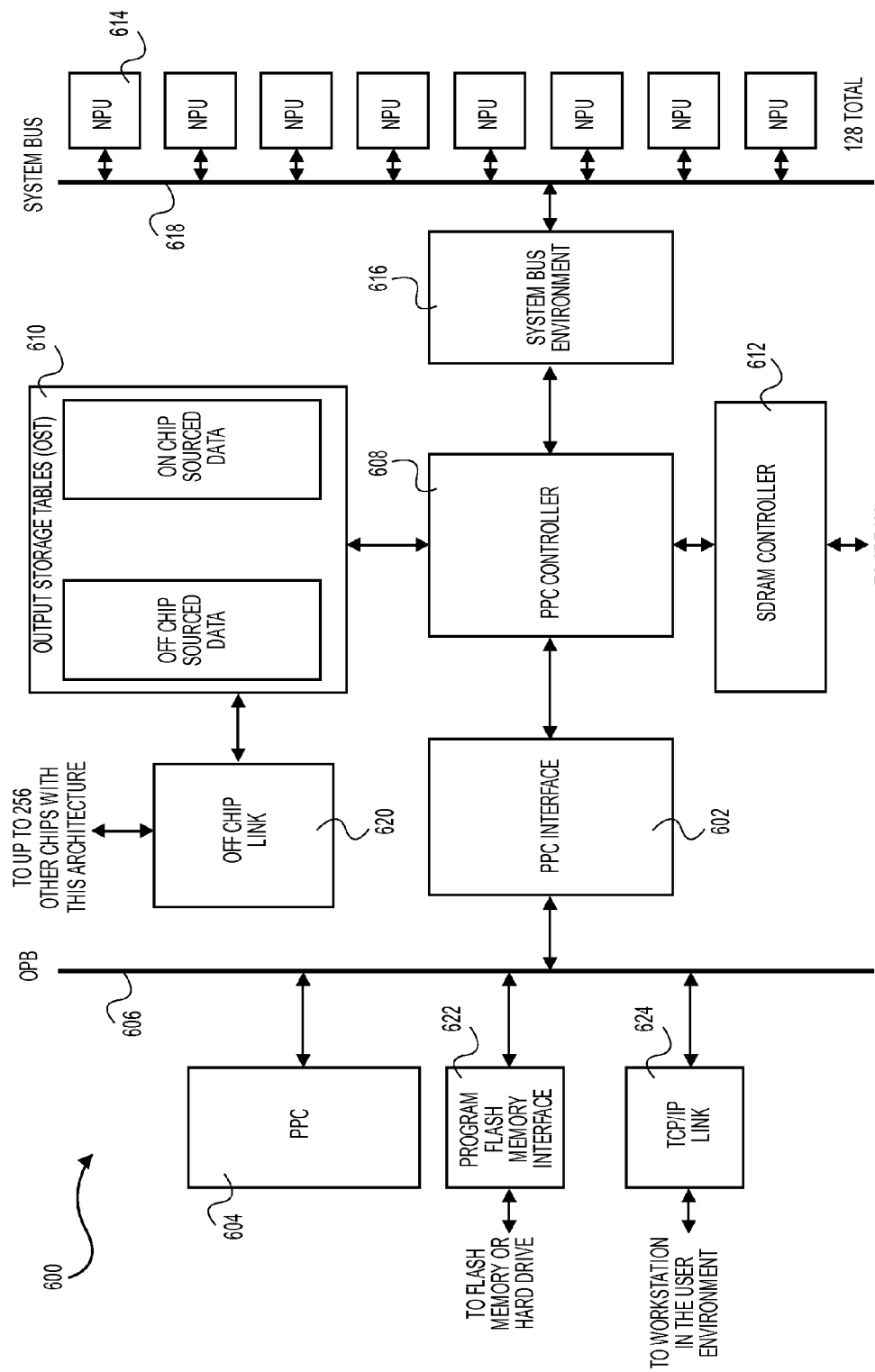

SPECIAL PURPOSE PROCESSOR IMPLEMENTING A SYNTHETIC NEURAL MODEL OF THE HUMAN BRAIN

CLAIM OF PRIORITY

This application is a continuation of U.S. patent application Ser. No. 11/426,881 entitled "Neural Modeling and Brain-Based Devices Using Special Purpose Processor" filed Jun. 27, 2006 by Snook, et al., which claims priority to U.S. Provisional Application No. 60/694,532 entitled "Neural Modeling and Brain-Based Devices Using Special Purpose Processor," filed Jun. 28, 2005, which applications are hereby incorporated by reference.

STATEMENT REGARDING FEDERALLY SPONSORED RESEARCH AND DEVELOPMENT

This invention was made with Government support under N00014-05-1-0205 awarded by the Office of Naval Research. The United States Government has certain rights in the invention.

FIELD OF THE INVENTION

The present invention relates to neural modeling, especially to neural modeling that can be used with brain-based devices.

BACKGROUND OF THE INVENTION

Intelligent systems have been developed which are intended to behave autonomously, automate tasks in an intelligent manner, and extend human knowledge. These systems are designed and modeled based on essentially three distinct fields of technology known, respectively, as
 (1) artificial intelligence (AI);
 (2) artificial neural networks (ANNs); and
 (3) brain-based devices (BBDs).
The intelligent systems based on AI and ANN include digital computers which are programmed to perform tasks as far ranging as playing chess to robotics. AI algorithms are logic-based and preprogrammed to carry out complex algorithms implemented with detailed software instructions. ANNs are an oversimplified abstraction of biological neurons that do not take into consideration nervous system structure (i.e. neuroanatomy) and often require a supervisory or teacher signal to get desired results. BBDs, on the other hand, are based on different principles and a different approach to the development of intelligent systems.

BBDs are based on fundamental neurobiological principles and are modeled after the brain bases of perception and learning found in living beings. BBDs incorporate a simulated brain or nervous system with detailed neuroanatomy and neural dynamics that control behavior and shape memory. BBDs also have a physical instantiation, called a morphology or phenotype, which allows active sensing and autonomous movement in the environment. BBDs, similar to living beings, organize unlabeled signals they receive from the environment into categories. When a significant environmental event occurs, BBDs, which have a simulated neuronal area called a value system, adapt the device's behavior.

The different principles upon which logic-based intelligent systems and BBDs operate are significant. As powerful as they are, logic-based machines do not effectively cope with novel situations nor process large data sets simultaneously. By their nature, novel situations cannot be programmed beforehand because these typically consist of unexpected and varying numbers of components and contingencies. Furthermore, situations with broad parameters and changing contexts can lead to substantial difficulties in programming. And, many algorithms have poor scaling properties, meaning the time required to run them increases exponentially as the number of input variables grows.

SUMMARY OF THE INVENTION

For the present invention there is described a detailed hardware system, i.e., a special purpose processor, that implements a synthetic neural model of the biological anatomy of the human brain for use in a brain-based device or BBD that is movable in a real-world environment.

Thus, the present invention is a special purpose processor that has:
 (a) a plurality of neural processing units, each one of the neural processing units having (i) a programmed processor, and (ii) a local memory, in which
  (i) the programmed processor of one neural processing unit processes data corresponding to a plurality of distinct neural elements, and in which each of the plurality of distinct neural elements has a plurality of pre-synaptic inputs received from outputs of other neural elements and an output providing post-synaptic output activity data to be sent to other neural elements; and
  (ii) the local memory stores a plurality of data records, each one of the data records having data corresponding to one of the neural elements of one of the neural processing units, in which each the data of each data record stores (a) a synaptic connection table defining synaptic connections between one of the neural elements and other of the neural elements, (b) a current weight data table having weight data corresponding to each synaptic connection through which the one neural element receives an input, and (c) an output storage table having post-synaptic output activity data resulting from processing by the one neural processing unit and provided on the output;
 (b) first system memory storing an output storage table having post-synaptic output activity data corresponding to each output of each neural element of each of the plurality of neural processing units;
 (c) second system memory for storing respective data records for each of the plurality of neural elements for each of the plurality of neural processing units, each of the data records having address pointers to the first system memory to access and output post-synaptic output activity data stored in the output storage table;
 (d) a finite state machine for controlling writing of the post-synaptic output activity data into the output storage table from the plurality of neural processing units and for reading the post-synaptic output activity data stored in the output storage table in response to the address pointers from the second system memory;
 (e) a system data bus for transferring data between the plurality of neural processing units and the first system memory and the second system memory;
 (f) sensors for receiving and providing sensed data corresponding to the real-world environment in which the BBD moves, wherein the plurality of neural processing units process the sensed data to calculate the weight data; and (g) actuators, responsive to the data processed by the plurality of neural processing units, for controlling movement of the BBD in the real-world environment; and (h) wherein (i) the plurality of neural processing units process data for all of the plurality of neural elements over a given time epoch and (ii) during the given time epoch, the output storage table and the current weight table are accessed to provide the post-synaptic output data and the current weight data for one neural element of the same neural processing unit.

BRIEF DESCRIPTION OF THE DRAWINGS

FIG. 6 is a diagram of a special purpose processor of one embodiment.

DETAILED DESCRIPTION

One embodiment of the present invention is a special purpose processor (SPP) which can include a chip to model multiple neural elements concurrently. The SPP can use a Field Programmable Gate Array (FPGA) to model large numbers of the neural elements. The use of FPGAs allows for parallel processing with relatively large input and output connectivity of the modeled neural elements. For the purposes of this application, an FPGA is any configurable logic device, such as a reconfigurable logic device, that can implement neural elements. An exemplary FPGA for use in the present invention is a Virtex™ series Xilinx™ FPGA available from the Xilinx Corporation of San Jose, Calif.

The Field Programmable Gate Array architecture lends itself to implementation in a number of other more power efficient and compact electronic devices. These devices include application specific integrated circuits (ASICs) and other applicable technologies. In an embodiment, ASICs are used to implement the invention.

It should be understood that, while embodiments of the invention are described herein as being implemented using SPPs, FPGAs, and/or ASICs, the invention is not limited to these example implementations. As will be appreciated by persons skilled in the relevant art(s), embodiments of the invention can be implemented using any data processing module, device or architecture. This includes, for example and without limitation, application specific integrated circuits (ASICs).

The neural model can include a relatively large number of neural elements. The neural elements each can execute a series of processes based on their inputs. The period for each series of processes serves as a cycle time called an epoch. The neural elements can perform their set of processes on their respective set of inputs within the epoch, making their outputs and any learning that they do available for use in the next epoch. The processes can include presynaptic calculation $102a$, postsynaptic calculation $102b$, and plasticity calculations $102c$. The core can use preloaded coefficients so that the core can model a specific type of neural element.

Figure 1A:
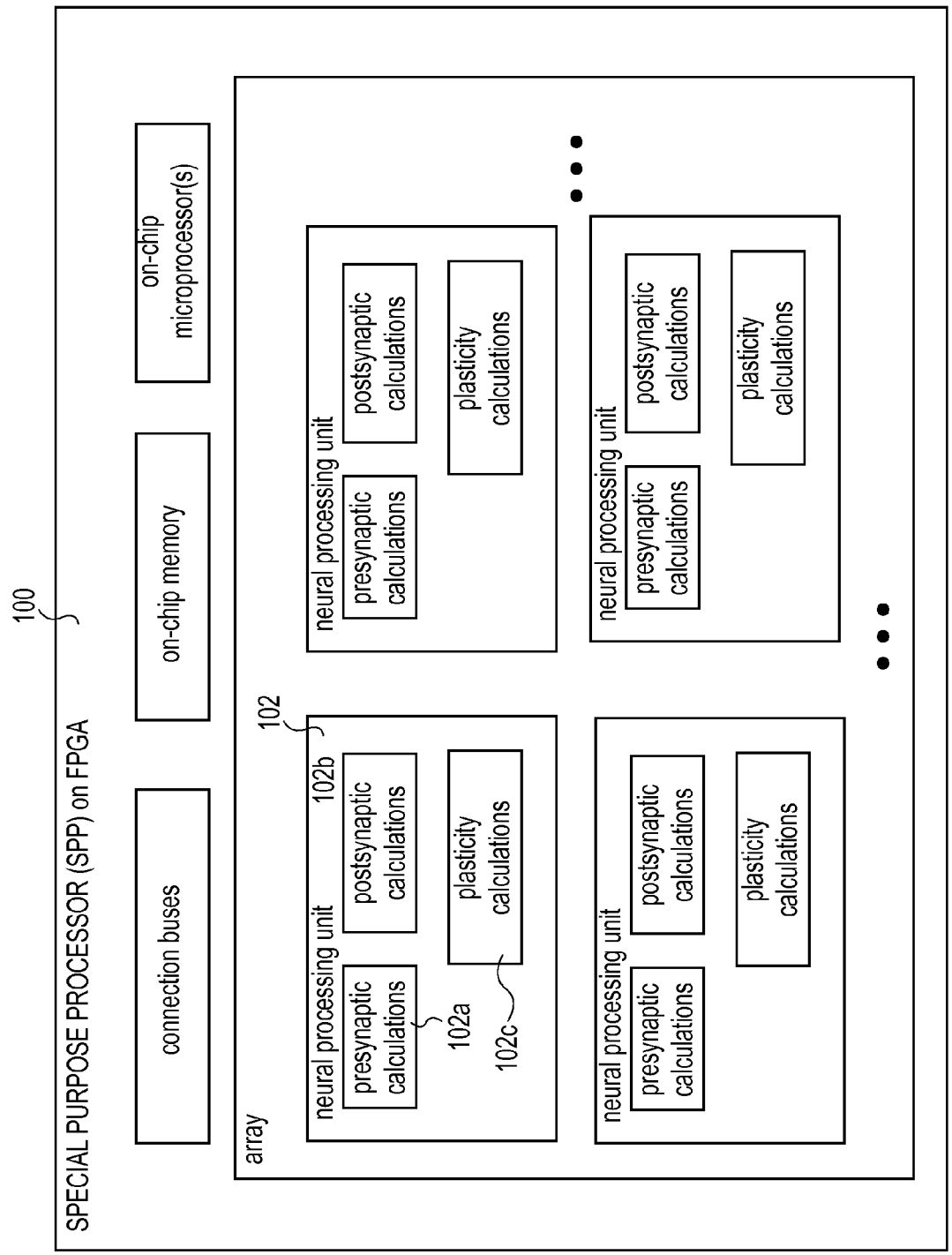
FIG. 1A is a diagram of a special purpose processor of one embodiment.

As shown in FIG. 1A, the SPP 100 can have a number of neural processing units 102 (also called "cores") that can implement the processes. The processes implemented by the cores 102 can include presynaptic calculations $102a$, postsynaptic calculations $102b$, and plasticity calculations $102c$.

The cores can use one or more groups of resources on the FPGA as required. As discussed below, cores can use resources, such as local memory, look-up tables, comparators and multipliers that can be arranged in a variety of ways on an FPGA. In one embodiment, each core uses multiple configurable logic blocks (CLBs) on the FPGA.

The SPP 100 can store the results of these processes, in on-chip or off-chip memory for the next epoch. In one embodiment, timeslices within the epoch allow each neural processing unit to model multiple neural elements. The total number of neural elements modeled can be given by (number of cores)*(number of timeslices in epoch). The more timeslices that are used, the larger the simulation, the longer the epoch, and the larger the neural element address required.

In neural modeling, each neural element can be considered to have a number of inputs. The inputs can be combined in a sum-of-products process, where each input is multiplied by a unique weight coefficient. This sum-of-products process is an example of a presynaptic calculation. The output of this sum-of-products, which can be a single value, can then be passed through a series of calculations, referred to as post-synaptic processing, to generate a single PostSynaptic Processing (PSP) output. Additionally, a series of plasticity calculations can be performed, which can include activity-dependent synaptic processes and value-dependent synaptic processes. These plasticity calculations can modify the weight values so that they have new learned values for the next epoch.

Figure 1B:
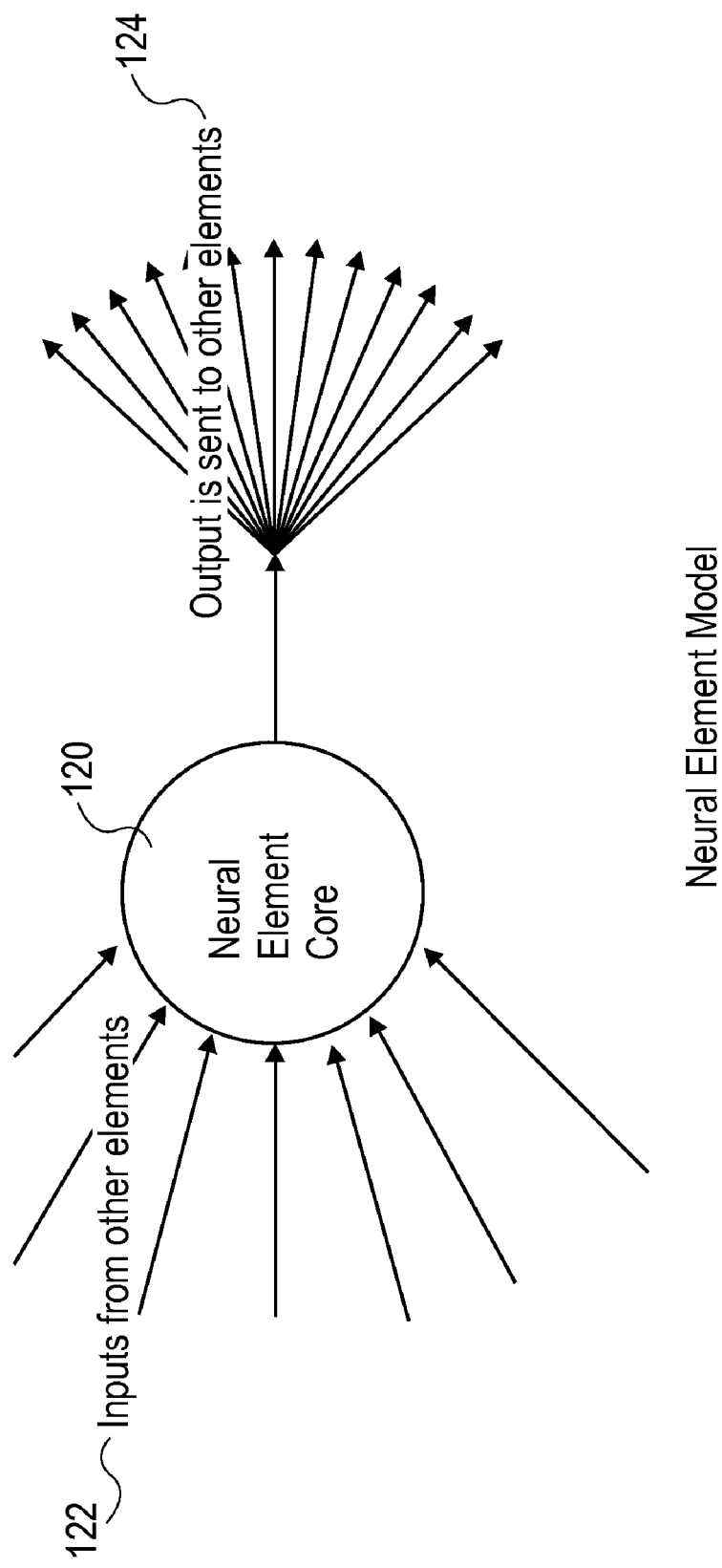
FIG. 1B is a diagram showing inputs and outputs to a neural element of a neural model of one embodiment.

The PSP outputs of each neural element can be connected as an input of a number of other neural elements in the next epoch. FIG. 1B is a diagram that illustrates the inputs 122 and outputs 124 of a core 120.

Figure 2:
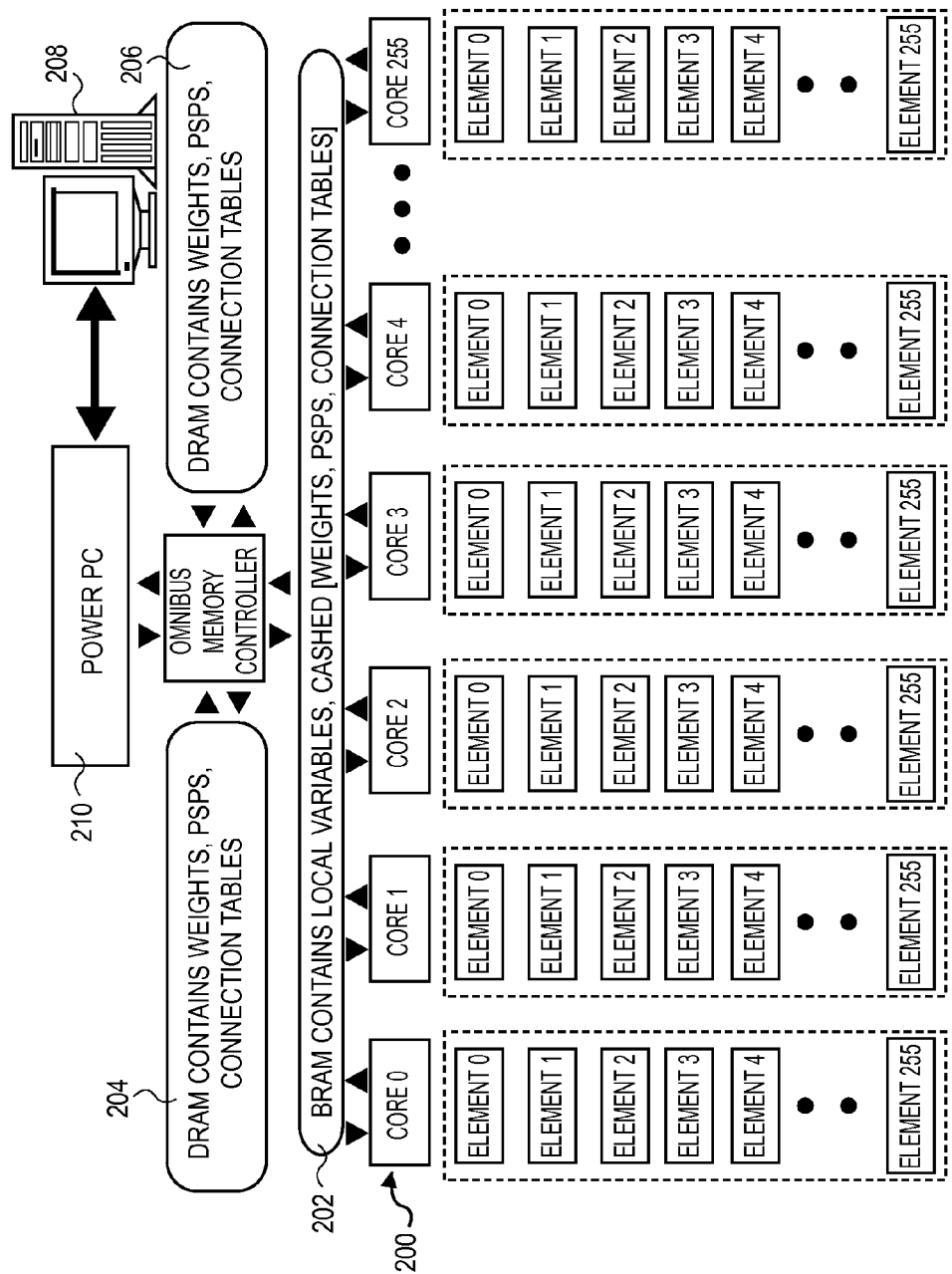
FIG. 2 is a diagram of a neural model using a special purpose processor of one embodiment.

FIG. 2 shows an example of a neural model using an SPP. The cores 200 can model specific types of neural units. For example, core 0 could model visual neurons; core 1 could model audio neurons, core 2 could model hippocampus neurons and the like. The cores 200 can have coefficients that are unique to the neural type of the core and help define the type of neuron modeled by the core. In an FPGA, functions that depend on coefficients can be implemented as Look-Up Tables (LUTs). These LUTs can also be different for different neural types.

In one embodiment, the coefficients don't change between the different timeslices. Thus, if there are 256 timeslices, each core can model 256 of the same type of neural element. If more of the same type of neural element is desired, multiple cores can be used with the total number of neural elements of a specific neural type given by (number of cores of given neural type)*(number of timeslices in epoch).

The on-chip memory 202 and off-chip memory 204 and 206 can store current and initial weights; PSP outputs, such as in an output storage table (OST); and connection tables. Each neural element can have associated with it specific inputs, which can be the outputs from other neural elements of a previous epoch. In one embodiment, memory, such as ping-pong buffers, is used to store the outputs of all the neural elements that are provided as inputs in the next epoch. In one embodiment, two tables are used to store outputs, one table including outputs from the last epoch and one table which is filled with outputs from the current epoch. Once a new epoch starts, the functions of the tables can switch.

Neural elements in different timeslices can be interconnected using memory to store the PSP outputs for the next epoch rather than immediately sent to a core in the current timeslice. In one embodiment, the number of inputs for each neural element is a relatively large number, such as 100 or more (256 in one embodiment), to better model the highly connected neuronal structure of the brain. In one embodiment, the output of the neuronal elements is also sent to a relatively large number of neural elements, such as 100 or more (256 in one embodiment), in the next epoch.

The neural elements can also be loaded with weights for the inputs. In one embodiment, the current weights can be loaded into the neural elements along with the input values, PSP outputs of the last epoch. The weights can be modified due to plasticity calculations and updated to be used in the next epoch. In one embodiment, each weight is used by a single neural element so only a single weight table is needed which can be updated before being accessed again by the neural element. In one embodiment, the current weights are different for each neural element so each core will use a number of weights given by (number of weights per neural element)* (number of timeslices) which may make it more feasible to store the weights outside the core, such as in a BRAM (buffer random access memory), even though the weights are not used by any other core.

In one embodiment, the initial weights, which may be used in the plasticity calculations, are provided from an initial weight table. Alternately, the initial weights can be stored locally. If the initial weights are stored locally, the initial weights can be selected using a scheme that minimizes the amount of initial weight data stored locally.

A connection table can store indications of the connections. In one embodiment, a connection indicates that an output from a specified neural element of the last epoch is to be sent as an input to a specified neural element of the current epoch. The output table can be arranged with the position in the output table indicating the source of the output. The elements of the connection table can be pointers into the output table. In one embodiment, the connection table has m pointers into the output table for each neural element, where m is the number of inputs per neural element.

In one embodiment, the cores are first loaded with the coefficients and LUTs. Then, for each timeslice of each epoch, each of the neural elements of the timeslice is loaded with inputs and current weights. Within an epoch, the loading can go in an order, such as (Core 0, timeslice 0), (Core 1, timeslice 0) . . . (Core 255, timeslice 0), (Core 0, timeslice 1) . . . (Core 254, timeslice 255), (Core 255, timeslice 255). The PSP output and the updated weights can be sent out to memory after the neural element finishes the processing. The transfer of the PSP outputs and the updated weights from the neural elements to memory can be done in the same order as the loading. In one embodiment, cores can be loaded for one timeslice while other cores are calculating for the previous timeslice. For example, core 12 can be loaded for timeslice 10 while core 245 is still calculating or waiting to store to memory for timeslice 9. In one embodiment, the system waits at least until the output storage table is completely filled before moving on to processing for a new epoch.

Figure 1C:
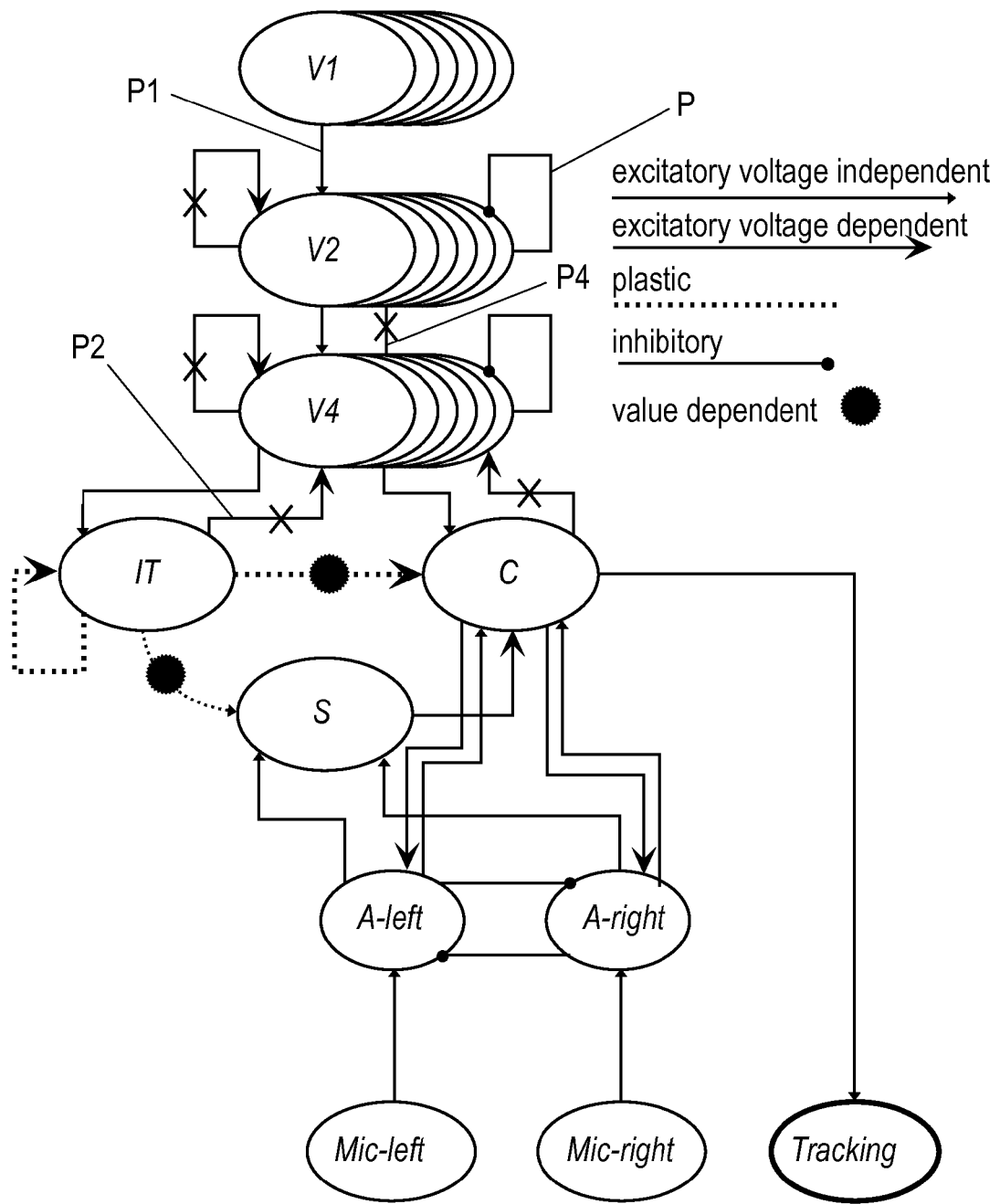
FIG. 1C is a schematic diagram of an exemplary regional and functional neuroanatomy of neural model which can guide the behavior of a brain-based device in its environment.
Figure 1D:
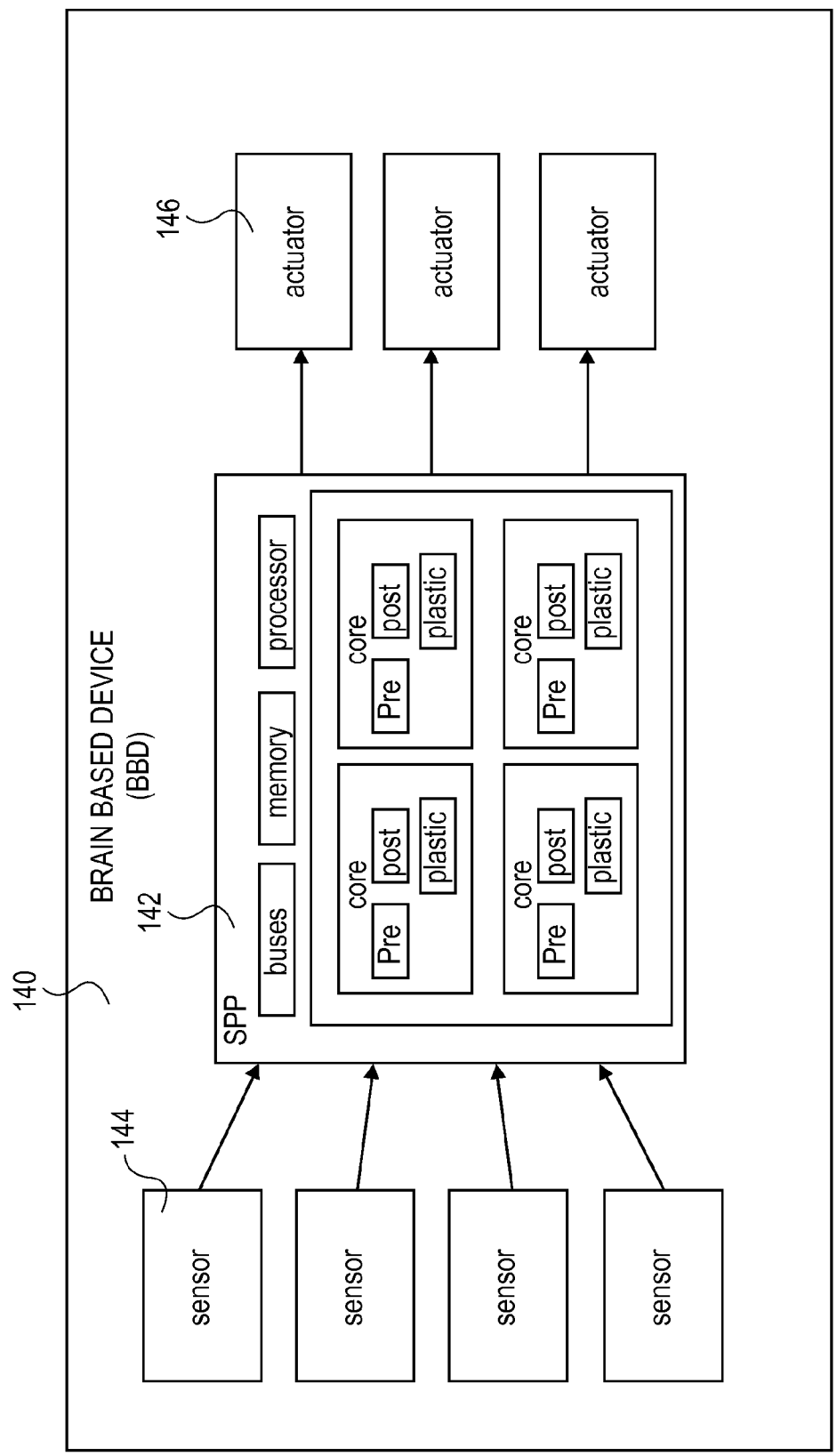
FIG. 1D is a diagram of a brain-based device including a special purpose processor.

As shown in FIG. 1D, a SPP 142 can be used to control a brain-based device (BBD) 140. In one embodiment, some input values for the neural units can be provided from sensors 144. Sensor signals, such as signals from video, audio, wheel, motor, tactile, suspension, accelerometer, gyro, and/or power management sensors, can be processed or fed directly as inputs to neural elements of an appropriate type. For example, some parts of the output storage table for the next epoch can be or be derived from sensor data. Additionally, some output storage table values can be used directly or be processed to control actuators 146. In that way, the SPP can control a robot, or other BBD device.

A BBD of the present invention can include a physically instantiated mobile device which can explore its environment and develop adaptive behavior while experiencing it. The BBD can also include a neural model, such as the SPP, located at the mobile device or remotely, for guiding the mobile device in its real-world environment.

The BBD can develop or adapt its behavior by learning about the environment using the neural model, such as the neural model implemented on the SPP. The mobile device can move autonomously in its environment. A BBD can use sensor signals as input to the neural model, such as a neural model implemented on the SPP, so that the neural model can control the BDD. For example, the mobile device can approach and view multiple objects that share visual features, e.g. same color, and have distinct visual features such as shape, e.g. red square vs. red triangle. The mobile device can become conditioned through the learning experience to prefer one target object, e.g. the red diamond, over multiple distracters or non-target objects such as the red square and a green diamond of a scene in its vision. The mobile device can learn this preference behaviorally while moving in its environment by orienting itself towards the target object in response to an audible tone or other stimulus.

The brain-based device can utilize a wide variety of multi modal active and/or passive sensor inputs for real time interaction with a broad range of environmental conditions. The sensory input can encompass both monocular and binocular vision with inputs across the full electromagnetic spectrum. Other sensors can include, but are not limited to, haptic, olfactory, audio, acoustic, and thermal. For example, the brain-based device can have sensors, such as a camera for vision and microphones which can provide visual and auditory sensory input to neural model, as well as actuators, such as effectors or wheels for movement. It can also have an infrared (IR) sensor for obstacle avoidance by sensing differences in reflectivity of the surface on which it moves, and for triggering reflexive turns of the BBD in its environment.

A variety of presynaptic, postsynaptic and plasticity calculations can be used. The neural model is not to be limited to the presynaptic, postsynaptic and plasticity calculations in the examples given below.

Figure 3A:
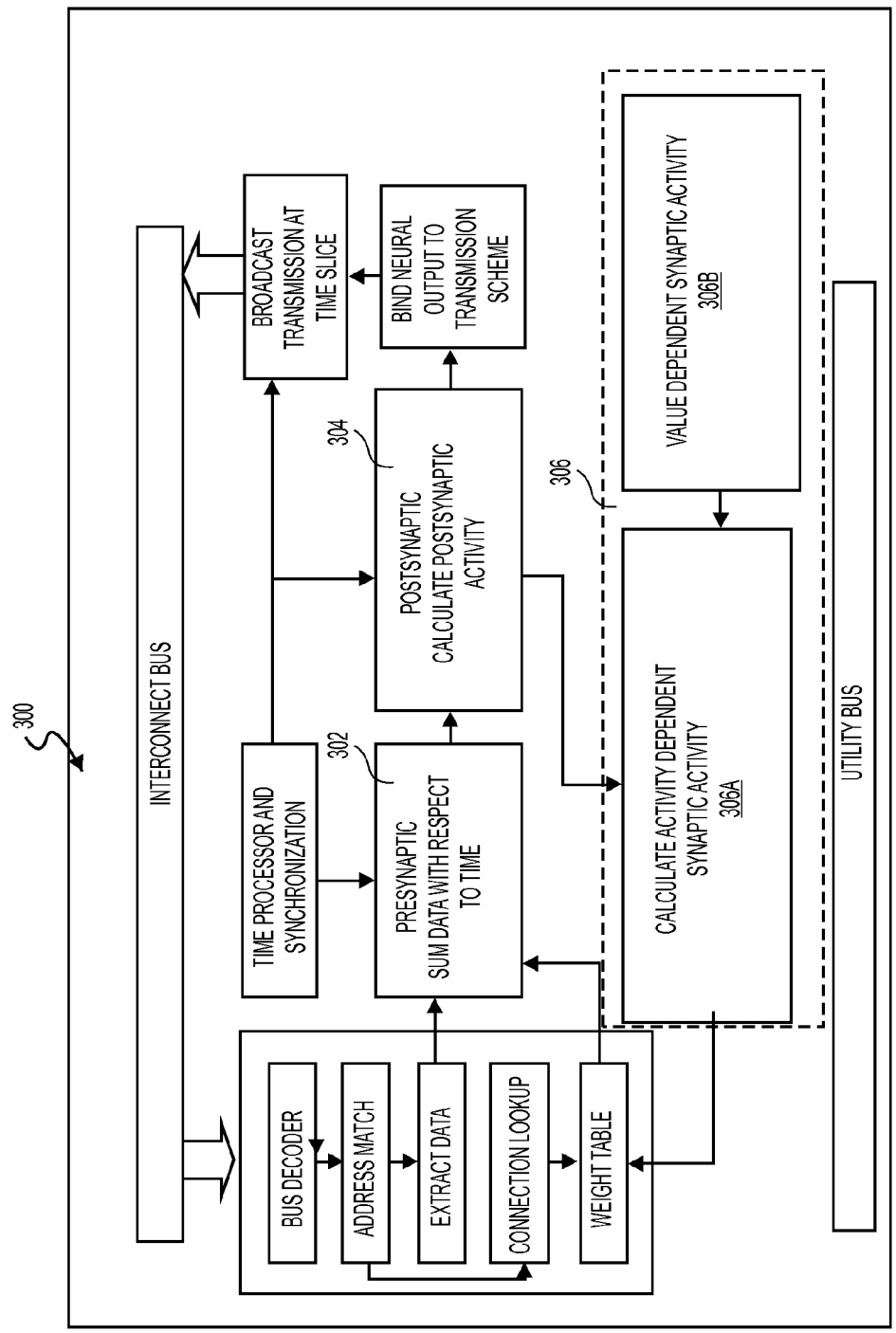
FIGS. 3A and 3B are diagrams of a core of one embodiment for a special purpose processor.

FIG. 3A is an embodiment that shows an example of a core 300. In this example, the core 300 includes presynaptic calculations 302, postsynaptic calculations 304 and plasticity calculations 306. In one embodiment, the plasticity calculations 306 can include activity dependent synaptic activity 306a and value dependent synaptic activity 306b. FIG. 3A also shows how the information can be passed into the core 300. In this embodiment, the plasticity calculations 306 receive the PSP output signals $S_{new}$ from the postsynaptic calculations 304. The plasticity calculations 306 can use $S_{new}$ and a value delay term, d, to produce updates for the weights in the weight table, which can be written back out to memory. The presynaptic calculation 302 can use the m weights and m input values to sum in a presynaptic calculation. This can then be sent to the postsynaptic calculation 304 that uses an output of the presynaptic calculations 302 as well as the previously stored PSP output for the last epoch, which can be stored locally. The PSP output from the core 300 can be sent back to the output storage table and the modified weights can be written back into the weight table.

Figure 3B:
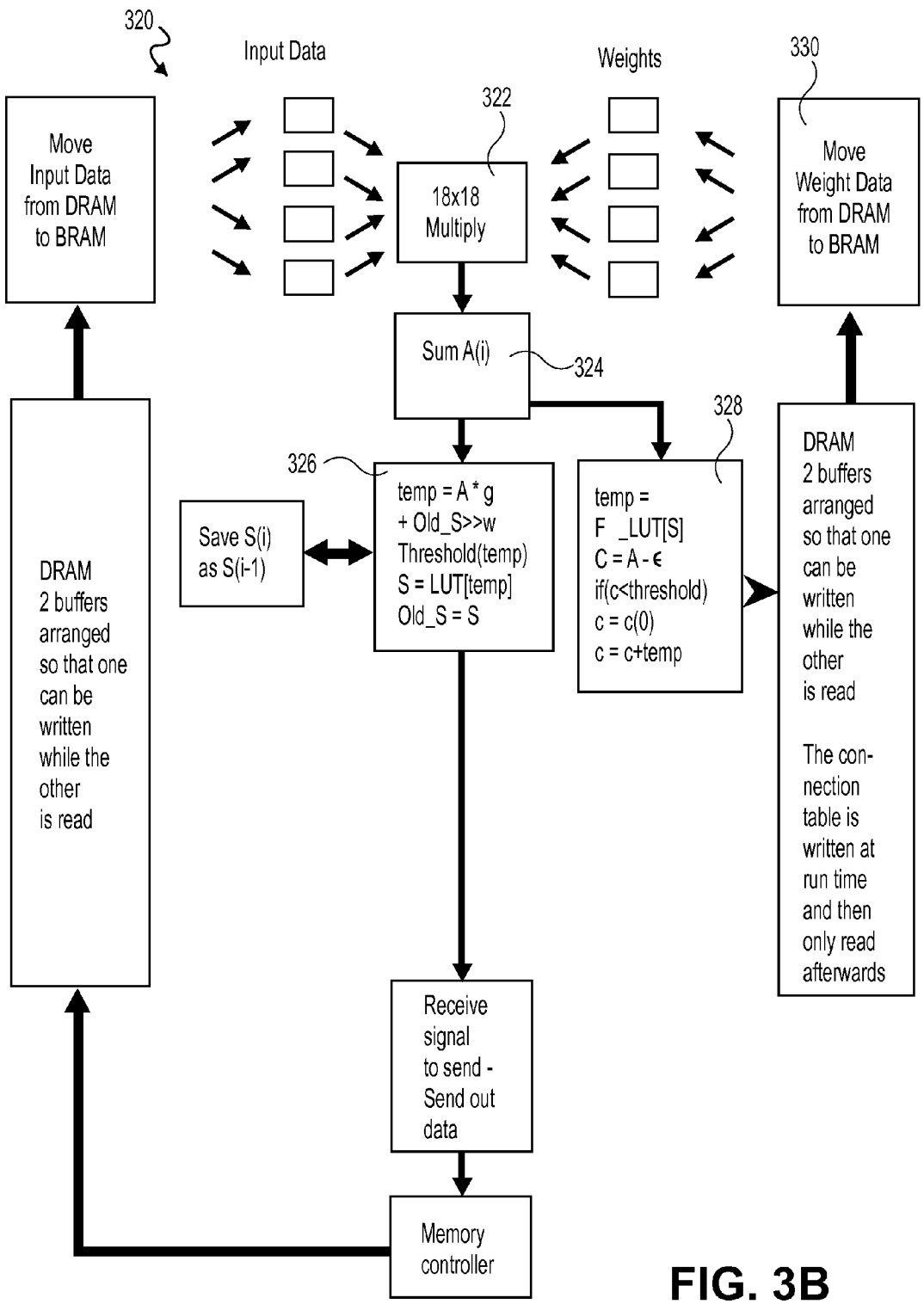

FIG. 3B illustrates an implementation of the core 320. The m input data and m weights are looped through multiply unit 322 and then summed in the accumulator 324. The postsynaptic processing of block 326 can include, in one embodiment, a multiplication and a shift or two multiplications along with a comparison and a lookup table operation. The postsynaptic calculations 328 can include a single table lookup plus m subtractions, m comparisons and up to m additions. The weight data can be written out to memory 330 for the next epoch. The PSP output can be stored locally and transferred to the output storage tables to be used by the other neural elements in the future.

Figure 4:
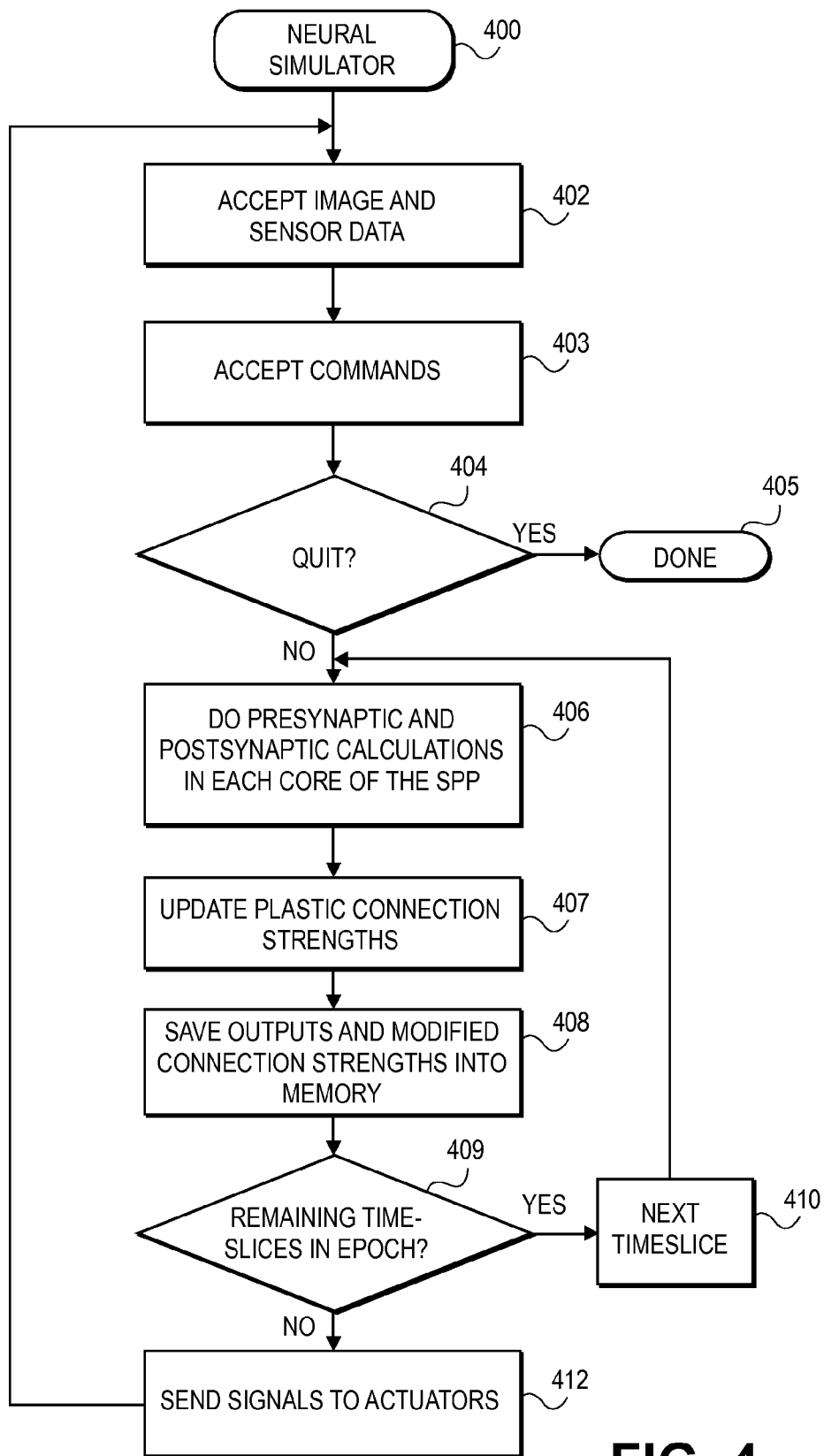
FIG. 4 is a flowchart of the operation of one embodiment of a brain-based device using a special purpose processor.

FIG. 4 illustrates a flowchart of the operation of one embodiment of a BBD using a SPP. In step 400, the neural stimulation begins. In step 402, sensor data is received. The sensor data can be directly provided to or processed to provide input(s) to neural element(s). In step 403, commands are accepted. These commands include quit commands, override commands or the like which can be done after the end of every epoch. In step 404, it is checked whether the BPP is to be halted in step 405. Steps 406, 407 and 408 illustrate calculations for one timeslice. In step 406 the presynaptic and postsynaptic calculations are done in each neural processing unit. In step 407, the connection weights are updated. In step 408, outputs and modified connections weights are sent to memory. As discussed above, these steps 406-408 can be done in parallel for each of the cores. In step 409, if there is any remaining timeslices in the epoch, the next timeslice calculation begins. Steps 406-408 are repeated for each timeslice in the epoch. In step 412, PSP outputs can directly provide or be processed to provide signals for actuators of a BBD.

In various embodiments, the PSP output can be a mean firing rate, s. In one embodiment, s can range from 0 (quiescent) to 1 (maximal firing). The state of a neuronal element can be updated as a function of its current state and contributions from other neuronal elements.

The m inputs for each neural element can be indicated as $s_1$ to $s_m$. The s values can be an unsigned byte of data. The m weights for each neural element can be indicated as $c_1$ to $c_m$. The c values can be a single signed byte. The presynaptic processing can be expressed by the equation:

$$A(t) = \sum_{j=1}^{m} c_{ij} s_j$$

where t indicates the current epoch. This can be implemented by using a multiplier, such as the 18×18 multiplier on the Virtex™-II Xilix™ FPGA.

The postsynaptic processing can be given by:

$$S_{new} = \phi(\tan h(g(A(t) + \omega S_{old})))$$

where A(t) is the current presynaptic output given above, $S_{new}$ is the current PSP output value of the neural element, $S_{old}$ is the PSP output value of the neural element in the last epoch, g is a scale coefficient and t is a persistence coefficient. tan h(x) which provides compression into the range −1 to 1.

$\phi(x)$ is a trigger function given by:

$$\phi(x) = \begin{matrix} 0; x < \delta \\ x; \text{otherwise} \end{matrix}$$

where δ is a trigger coefficient.

The trigger function $\phi(x)$ along with the tan h(x) function ensures that $S_{new}$ is between 0 and 1. The $S_{new}$ value can be sent to the output storage table. The $S_{new}$ value can also be stored locally to be used as $S_{old}$ in the next epoch.

The postsynaptic processing can be implemented in the FPGA as follows. The $S_{old}$ value can be multiplied by ω, the persistence parameter. Assuming that ω is restricted to a value in the series ½, ¼, ⅛. . . , the multiplication can be implemented by a shift. The result of the multiplication (or shift) can be added to the A(t) value from the presynaptic processing. The result of the addition can be multiplied by the scale coefficient, g, in a multiplier, such as the 18×18 multiplier of the Virtex™-II Xilinx™ FPGA to produce a temp value. The temp value can be used as an input to the function $\phi(\tan h(temp))$ implemented as $LUT_1$ to determine $S_{new}$. Thus:

$$S_{new} = LUT_1[g(A(t) + (S_{old} >> W))]$$

where $S_{old} >> W$ is *right shift W spaces which is the same as* $\omega S_{old}$, where $\omega = 2^{-W}$.

Alternately, the temp value can be compared to $\tan h^{-1}(\delta)$, which is a constant, and if temp>=$\tan h^{-1}(\delta)$, the temp value can be used as an input to the function tan h(temp) implemented as $LUT_{1'}$ to determine $S_{new}$. Otherwise, $S_{new}=0$. This alternate embodiment can allow sharing of the $LUT_{1'}$ between cores of different neural types.

Thus:

$$S_{new} = \begin{matrix} LUT_1 \cdot \left[ g \begin{pmatrix} A(t) + \\ (S_{old} >> W) \end{pmatrix} \right] & \text{for } g(A(t) + (S_{old} >> W)) >= \tanh^{-1}(\delta) \\ 0 & \text{for } g(A(t) + (S_{old} >> W)) <= \tanh^{-1}(\delta) \end{matrix}$$

The plasticity processing can be given by:

$$\Delta c_j = \epsilon(c_j(0) - c_j(t)) + \eta SF(S); \text{without value dependency}$$

$$\Delta c_j = \epsilon(c_j(0) - c_j(t)) + \eta SF(S)V(d); \text{with value dependency}$$

where $\Delta c_j = \epsilon(c_j(0) - c_j(t))$ is the forgetting rule, $\eta SF(S)$ is the value independent learning rule and $\eta SF(S)V(d)$ is the value dependent learning rule. $c_j(0)$ is the initial weight for the jth input and $c_j(t)$ is the current weight for the jth input. $\epsilon$ is a decay constant, $\eta$ is a learning rate constant. S is a post synaptic output, such as $S_{new}$.

F(S) can be given by:

$$F(S) = \begin{cases} 0; & \text{for } S < \theta_1 \\ \kappa_1(\theta_1 - S); & \text{for } \theta_1 < S < \frac{\theta_1 + \theta_2}{2} \\ \kappa_1(S - \theta_2); & \text{for } \frac{\theta_1 + \theta_2}{2} < S < \theta_2 \\ \frac{\kappa_2 \tanh(\rho(s - \theta_2))}{\rho} & \text{for } S > \theta_2 \end{cases}$$

Where $\theta_1$ and $\theta_2$ are threshold constants with ($0 < \theta_1 < \theta_2 < 1$), $\kappa_1$ and $\kappa_2$ are inclination constants, and $\rho$ is a saturation parameter, which can be 6 for all cores.

V(d) can be a function that relates to the intensity of the value learning. This function or an associated look up table can be adjusted as desired.

In one embodiment V(d) is given by:

$$V(d) = 1 + f(d)\frac{\bar{S} + V(d-1)(d-1)}{d}$$

where d is a delay, such as the number of epochs since the start of the value dependent event. When no value learning is being done, d can be defined to be 0 with V(d=0) defined to be 1. The d values during value learning can range from 1 to $d_{max}$, where $d_{max}$*(epoch period) is the value learning period. Thus, in one example, an epoch is 10 ms and the desired value learning period is 900 ms, so $d_{max}$ is 90. f(d) can be a function that starts at about 0, reaches a peak of 1 and returns to about 0 at $d_{max}$. f(d) can be used to delay the initiation of and spread the operation of value learning. One possible series for f(d) can be defined by a curve including the points $f(d_{max}/9)=0.1$, $f(2d_{max}/9)=0.1$, $f(3d_{max}/9)=0.3$, $f(4d_{max}/9)=0.7$, $f(5d_{max}/9)=1.0$, $f(6d_{max}/9)=1.0$, $f(7d_{max}/9)=0.7$, $f(8d_{max}/9)=0.3$, $f(d_{max})=0.1$. $\bar{S}$ can be average activity value in an area S. V(d−1) can be the value of V in the previous epoch.

The plasticity can be implemented on an FPGA as follows. The $S_{new}$ value can be used as an input to the function $\eta S \, F(S)$ implemented as $LUT_2$ to get a $Temp_1$ value. If a Value_Enabled flag is set, the d, or Value_term, can be used as an input to the function $$1 + f(d)\frac{\bar{S} + V(d-1)(d-1)}{d}$$

implemented as $LUT_3$ to get a $Temp_2$ value and the learning rule term is given by $Temp_1 * Temp_2$. Otherwise the learning rule term is given by $Temp_1$.

In one embodiment, the $LUT_3$ lookup and a multiplication is done when the Value_Enabled flag is not set so the processing time, and thus potentially the epoch length, is not longer during the value learning period. If it is desirable to have specific neural type(s) not implement value learning, these cores of these neural type(s) can have a $LUT_3$ that includes dummy values.

For each of the m weights, the forgetting rule portion can be approximated by doing a subtraction of a coefficient E from the current weight, checking whether this subtraction value is less than the original weight and then adding the greater of the original weight or the subtraction value to the forgetting rule portion. This approximation only requires a subtraction and a compare for each of the m weights rather than a multiplication. Thus:

$$c_j(t+1) = \begin{cases} (c_j(t) - E) + LUT_2[S] * LUT_3[d] & \text{for } (c_j(t) - E) > c_j(0) \\ c_j(0) + LUT_2[S] * LUT_3[d] & \text{otherwise} \end{cases}$$

When the Value_Enabled flag is not set, d can have a value of 0 and $LUT_3[d=0]$ can have a value of 1, so that $LUT_2[S]*LUT_3[d=0]=LUT_2[S]$ which gives the value independent learning rule. Similarly, $LUT_3[x]$ can be 1 for all x in cores that don't do value learning. The size of $LUT_3$ can be kept small by using fewer values than the total number of epochs of the learning period. In one embodiment, groups of epochs since the initiation of value learning can have the same d value. For example, epochs 1-10 can correspond to d=1, epochs 11-20 can correspond to d=2 ... and so on.

Coefficients that are unique to each core can include w (or W) and g which are post-synaptic scale factors, the Phi threshold and the tan h lookup table ($LUT_1$) for the post-synaptic calculations. For the plasticity function, the core specific variables can be the F*n lookup table ($LUT_2$), the decay constant E and the variables associated with value learning, such as $LUT_3$. Exemplary code to implement the calculations is given in APPENDIX I.

The example given above doesn't use phase information in the neural model of the SPP. This simplifies the calculations and can allow the cores to run faster and use fewer FPGA resources. In one embodiment, the SPP can be a neural model that takes phase information into account and/or distinguish contributions of voltage-independent, voltage-dependent, and phase-independent synaptic connectors.

A phase can be associated with each of the PSP output values. For example, a phase (p) can be divided into discrete values representing the relative timing of activity of the neuronal units by an angle ranging from 0 to $2\pi$. If five bits are used to encode the phase, 32 discrete phases can be encoded. In one embodiment, the output of each neuronal element can include a byte to encode the s value and a byte to encode the p value. The s and p values can be transferred as a pair in the SPP, effectively doubling the storage requirements in the output storage table and transmission requirements for the PSP outputs. The presynaptic, postsynaptic and plasticity calculations in the cores are also complicated when p values are used. Examples of phase-dependent presynaptic, postsynaptic and plasticity calculations that can be adapted for use in an SPP are given in the article, Seth et al., "Visual Binding Through Reentrant Connectivity and Dynamic Synchronization in a Brain-based Device" Cerebral Cortex V14 N11 p. 1185-1199, incorporated herein by reference. Exemplary coefficients, including coefficients for determining the LUTs, are given in Tables 1 and 2 for different neural types.

TABLE 1

Neuronal unit parameters

| Area | Size | σ-fire | σ-phase | σ-vdep | ω | G |
|---|---|---|---|---|---|---|
| V1 (6) | 60 × 80 | — | — | — | — | — |
| V2 (6) | 30 × 40 | 0.10 | 0.45 | 0.05 | 0.30 | 1.0* |

TABLE 1-continued

Neuronal unit parameters

| Area | Size | σ-fire | σ-phase | σ-vdep | ω | G |
|---|---|---|---|---|---|---|
| V4 (6) | 15 × 20 | 0.20 | 0.45 | 0.10 | 0.50 | 1.0* |
| C | 15 × 20 | 0.10 | 0.10 | 0.10 | 0.50 | 1.0 |
| IT | 30 × 30 | 0.20 | 0.20 | 0.10 | 0.75 | 1.0 |
| S | 4 × 4 | 0.10 | 0.00 | 0.00 | 0.15 | 1.0 |
| Mic- | 1 × 1 | — | — | — | — | — |
| Mic-left | 1 × 1 | — | — | — | — | — |
| A-left | 4 × 4 | 0.00 | 0.00 | 0.10 | 0.50 | 1.0 |
| A-right | 4 × 4 | 0.00 | 0.00 | 0.10 | 0.50 | 1.0 |

TABLE 2

Properties of anatomical projections and connection types

| Projection | Arbor | P | $c_{ij}(0)$ | type | η | $θ_1$ | $θ_2$ | k1 | k2 |
|---|---|---|---|---|---|---|---|---|---|
| V1->V2 | [ ] 0 × 0 | 1.00 | 1, 2 | PI | 0.00 | 0 | 0 | 0.00 | 0.00 |
| V2→V2(intra) | [ ] 3 × 3 | 0.75 | 0.45, 0.85 | VD | 0.00 | 0 | 0 | 0.00 | 0.00 |
| V2→V2(inter) (X) | [ ] 2 × 2 | 0.40 | 0.5, 0.65 | VD | 0.00 | 0 | 0 | 0.00 | 0.00 |
| V2→V2(intra) | Θ 18, 25 | 0.10 | −0.05, −0.1 | VI | 0.00 | 0 | 0 | 0.00 | 0.00 |
| V2→V2(inter) | [ ] 2 × 2 | 0.05 | −0.05, −0.1 | VI | 0.00 | 0 | 0 | 0.00 | 0.00 |
| V2→V4 | [ ] 3 × 3 | 0.40 | 0.1, 0.12 | VI | 0.00 | 0 | 0 | 0.00 | 0.00 |
| V4→V2 (X) | [ ] 1 × 1 | 0.10 | 0.25, 0.5 | VD | 0.00 | 0 | 0 | 0.00 | 0.00 |
| V4→V4(inter) (X) | [ ] 2 × 2 | 0.40 | 1.75, 2.75 | VD | 0.00 | 0 | 0 | 0.00 | 0.00 |
| V4→V4(intra) | Θ 10, 15 | 0.10 | −0.15, −0.25 | VI | 0.00 | 0 | 0 | 0.00 | 0.00 |
| V4→V4(inter) | Θ 10, 15 | 0.10 | −0.15, −0.25 | VI | 0.00 | 0 | 0 | 0.00 | 0.00 |
| V4→V4(inter) | [ ] 2 × 2 | 0.03 | −0.15, −0.25 | VI | 0.00 | 0 | 0 | 0.00 | 0.00 |
| V4→C | [ ] 3 × 3 | 1.00 | 0.002, 0.0025 | VI | 0.00 | 0 | 0 | 0.00 | 0.00 |
| V4→IT | special | — | 0.1, 0.15 | VI | 0.00 | 0 | 0 | 0.00 | 0.00 |
| IT→V4 (X) | non-topo | 0.01 | 0.05, 0.07 | VD | 0.00 | 0 | 0 | 0.00 | 0.00 |
| IT→IT | non-topo | 0.10 | 0.14, 0.15 | VD | 0.10 | 0 | 0.866 | 0.90 | 0.45 |
| IT→C # | non-topo | 0.10 | 0.2, 0.2 | VD | 1.00 | 0 | 0.707 | 0.45 | 0.65 |
| IT→S # | non-topo | 1.00 | 0.0005, 0.001 | VI | 0.10 | 0 | 0.707 | 0.45 | 0.45 |
| C→V4 (X) | non-topo | 0.01 | 0.05, 0.07 | VD | 0.00 | 0 | 0 | 0.00 | 0.00 |
| C→C | Θ 6, 12 | 0.50 | −0.05, −0.15 | PI | 0.00 | 0 | 0 | 0.00 | 0.00 |
| C→Mleft | non-topo | 1.00 | 35, 35 | VD | 0.00 | 0 | 0 | 0.00 | 0.00 |
| C→Mright | non-topo | 1.00 | 35, 35 | VD | 0.00 | 0 | 0 | 0.00 | 0.00 |
| S→C | non-topo | 0.50 | 0.5, 05 | VD | 0.00 | 0 | 0 | 0.00 | 0.00 |
| S→S | non-topo | 0.50 | 0.7, 0.8 | VD | 0.00 | 0 | 0 | 0.00 | 0.00 |
| A-left→C | left-only | 1.00 | 0.5, 0.5 | VD | 0.00 | 0 | 0 | 0.00 | 0.00 |
| A-right→C | right-only | 1.00 | 0.5, 0.5 | VD | 0.00 | 0 | 0 | 0.00 | 0.00 |
| A-left→C | right-only | 1.00 | −0.15, −0.15 | PI | 0.00 | 0 | 0 | 0.00 | 0.00 |
| A-right→C | left-only | 1.00 | −0.15, −0.15 | PI | 0.00 | 0 | 0 | 0.00 | 0.00 |
| A-left→S | non-topo | 1.00 | 35, 35 | VD | 0.00 | 0 | 0 | 0.00 | 0.00 |
| A-right→S | non-topo | 1.00 | 35, 35 | VD | 0.00 | 0 | 0 | 0.00 | 0.00 |
| A-left ⇆ A-right | non-topo | 1.00 | −1, −1 | PI | 0.00 | 0 | 0 | 0.00 | 0.00 |
| A-left ⇆ A-right | non-topo | 1.00 | −0.5, −0.5 | VD | 0.00 | 0 | 0 | 0.00 | 0.00 |
| Mic-left, Mic-right→A-left, A-right | non-topo | 1.00 | 5, 5 | PI | 0.00 | 0 | 0 | 0.00 | 0.00 |

FIG. 1C is a schematic diagram of an exemplary regional and functional neuroanatomy of a neural model which can guide the behavior of the BBD in its environment. These regions can be implemented as cores of an SPP. The neural model can be modeled on the anatomy and physiology of the mammalian nervous system but, as can be appreciated, with far fewer neurons and a much less complex architecture. The neural model can include a number of neural areas labeled according to the analogous cortical and subcortical regions of the human brain. Thus, FIG. 1C shows respective neural areas labeled as V1, V2, V4, IT, S, A-left, Mic-left, A-right, Mic-right and C, whose activity controls the tracking of a BBD. Each neural area V1, V2, etc. contains different types of neuronal units, each of which represents a local population of neurons. Each ellipse shown in FIG. 1C (except "tracking") denotes a different neural area, with each such area having many neuronal units.

The neuroanatomy of FIG. 1C also shows schematically various projections P throughout the neural model. A projection can be "feedforward" from one neural area to another, such as the projection P1 from neural area V1 to neural area V2. A projection P may also be "reentrant" between neural areas such as the reentrant projection P2 from neural area IT to neural area V4 and reentrant projection P4 from neural area V4 to neural area V2. Reentrant projections P marked with an "X" were removed from the neural model during "lesion" experiments as will be further described. Furthermore, projections P have properties as indicated by the legend in FIG. 1C, which are (1) "excitatory voltage independent," (2) "excitatory voltage dependent," (3) "plastic," (4) "inhibitory," and (5) "value dependent."

The neural model shown in FIG. 1C can be comprised of four systems: a visual system, a tracking system, an auditory system and a value system. Other systems with other inputs and outputs can also be used.

FIG. 1C: The Visual System. Neural Areas V1, V2, V4, IT

The visual system can be modeled on the primate occipitotemporal or ventral cortical pathway and includes neural areas V1→V2→V4→IT in which neurons in successive areas have progressively larger receptive fields until, in the inferotemporal cortex, receptive fields cover nearly the entire visual field. Visual images from a camera can be filtered for color and edges and the filtered output directly influences neural activity in area V1. V1 can be divided into subregions (not shown) each having neuronal units that respond preferentially to green (V1-green), red (V1-red), horizontal line segments (V1-horizontal), vertical line segments (V1-vertical), 45-degree lines (V1-diagonal-right), and 135-degree lines (V1-diagonal-left). This visual system provides a computationally tractable foundation for analyzing higher-level interactions within the visual system and between the visual system and other cortical areas.

Subregions of neural area V1 can project topographically to corresponding subregions of neural area V2. The receptive fields of neuronal units in area V2 can be narrow and correspond closely to pixels from the image of a camera. Neural area V2 can have both excitatory and inhibitory reentrant connections within and among its subregions. Each V2 subregion can project to a corresponding V4 subregion topographically but broadly, so that neural area V4's receptive fields are larger than those of neural area V2. Neural area V4 subregions can project back to the corresponding neural area V2 subregions with non-topographic reentrant connections. The reentrant connectivity within and among subregions of area V4 is similar to that in area V2. V4 projects in turn non-topographically to neural area IT so that each neuronal unit in neural area IT can receive input from three V4 neuronal units randomly chosen from three different V4 subregions. Thus, while neuronal units in IT respond to a combination of visual inputs, the level of synaptic input into a given IT neuronal unit is fairly uniform; this prevents the activity of individual IT neuronal units from dominating the overall activity patterns. IT neuronal units project to other IT neuronal units through plastic connections, and back to neural area V4 through non-topographic reentrant connections.

FIG. 1C: The Tracking System. Neural Area C

The tracking system allows the BBD to orient towards auditory and visual stimuli. The activity of neural area C (analogous to the superior colliculus) can dictate where the BBD directs its camera gaze. Tracking in the BBD can be achieved by signals to wheels or tracks based on the vector summation of the activity of the neuronal units in area C. Each neuronal unit in area C can have a receptive field which matches its preferred direction, and the area has a topographic arrangement such that if activity is predominately on the left side of area C, signals to the BBD wheels are issued that evoke a turn towards the left. The auditory neural areas (A-left and A-right) can have strong excitatory projections to the respective ipsilateral sides of area C causing the BBD to orient towards a sound source. Neural area V4 projects topographically to area C, its activity causing the BBD to center its gaze on a visual object (e.g. a red triangle). Both neural areas IT and the value system S project to area C, and plastic connections in the pathways IT->C and IT->S facilitate target selection by creating a bias in activity, reflecting salient perceptual categories (see Value System, below). As will be described below, prior to a conditioning or training stage, because of a lack of bias, the BBD will direct its gaze predominately between two objects in its environment (e.g. a red triangle and a red square). After learning to prefer a visual object (e.g. a red triangle), changes in the strengths of the plastic connections can result in greater activity in those parts of area C corresponding to the preferred object's position.

FIG. 1C: The Auditory System, Neural Areas Mic-left, Mic-right, A-left, A-right

This system converts inputs from microphones into simulated neuronal unit activity. In one embodiment, Neural areas Mic-left and Mic-right can be respectively activated whenever the corresponding microphones 16, 18 detect a sound of sufficient amplitude within a specified frequency range. Mic-left/Mic-right project to neuronal units in areas A-left/A-right. Sound from one side can result in activity on the ipsilateral side of the auditory system, which in turn produces activity on the ipsilateral side of area C causing orientation of the BBD towards the sound source.

FIG. 1C: The Value System, Neural Area S

Activity in the simulated value system can signal the occurrence of salient sensory events and this activity contributes to the modulation of connection strengths in pathways IT→S and IT→C. Initially, in the learning stage to be described below, neural area S is activated by sounds detected by the auditory system (see A-left→S and A-right→S of nervous system 12). Activity in area S can be analogous to that of ascending neuromodulatory systems in that it is triggered by salient events, influences large regions of the neural model (described below in the section Synaptic Plasticity), and persists for several cycles. In addition, due to its projection to the tracking area C, area S has a direct influence on the behavior of the BBD in its real-world environment.

Details of the values of certain parameters of the neuronal units within the respective neural areas V1, V2, etc. shown in FIG. 1C are given in Table 1, described above. Details of the anatomical projections and connection types of neuronal units of the neural areas V1, V2, etc. are given in Table 2, described above. As is known, a neuronal unit can be considered pre- or post-a synapse (see "Universe of Consciousness" by Edelman and Tononi, Basic Books, 2000, FIG. 4.3, for a description of a synapse and pre- and post-synaptic neurons).

Neuronal Units Generally

In one embodiment, a neuronal unit within a neural area V1, V2, etc. of the neural model 12 is simulated by a mean firing rate model. The state of each neuronal unit is determined by both a mean firing rate variable ($\sigma$) and a phase variable (P). The mean firing rate variable of each neuronal unit corresponds to the average activity or firing rate of a group of roughly 100 neurons during a time period of approximately 100 milliseconds. The phase variable, which specifies the relative timing of firing activity, provides temporal specificity without incurring the computational costs associated with modeling of the spiking activity of individual neurons in real-time (see Neuronal Unit Activity and Phase, below).

Synaptic Connections—Generally

In one embodiment, synaptic connections between neuronal units, both within a given neural area, e.g. V1 or C, and between neural areas, e.g. V2→V4 or C→V4, are set to be either voltage-independent or voltage-dependent, either phase-independent or phase-dependent, and either plastic or non-plastic. Voltage-independent connections provide synaptic input to a post-synaptic neuron regardless of the post-synaptic state of the neuron. Voltage-dependent connections represent the contribution of receptor types (e.g. NMDA receptors) that require post-synaptic depolarization to be activated. In other words, a pre-synaptic neuron will send a signal along its axon through a synapse to a post-synaptic neuron. The post-synaptic neuron receives this signal and integrates it with other signals being received from other pre-synaptic neurons.

A voltage independent connection is such that if a pre-synaptic neuron is firing at a high rate, then a post-synaptic neuron connected to it via the synapse will fire at a high rate.

A voltage dependent connection is different. If the post-synaptic neuron is already firing at some rate when it receives a pre-synaptic input signal, then the voltage-dependent connection will cause the post-synaptic neuron to fire more. Since the post-synaptic neuron is active, i.e. already firing, this neuron is at some threshold level. Therefore, the pre-synaptic connection will modulate the post-synaptic neuron to fire even more. The voltage-dependent connection, no matter how active the pre-synaptic neuron is, would have no effect on the post-synaptic neuron if the latter were not above the threshold value. That is, the post-synaptic neuron has to have some given threshold of activity to be responsive or modulated by a voltage-dependent synaptic connection.

In the neural model of FIG. 1C, all within-neural area excitatory connections and all between-neural area reentrant excitatory connections can be voltage-dependent (see FIG. 1C and Table 2). These voltage-dependent connections, as described above, play a modulatory role in neuronal dynamics.

Phase-dependent synaptic connections influence both the activity, i.e. firing rate, and the phase of post-synaptic neuronal units, whereas phase-independent synaptic connections influence only their activity. All synaptic pathways in the neural model can be phase-dependent except those involved in motor output (see Table 2: A-left/A-right→C, C→C) or sensory input (see Table 2: Mic-left/Mic-right→A-left/A-right, A-left→A-right, V1→V2), since signals at these interfaces are defined by magnitude only. Plastic connections are either value-independent or value-dependent, as described below.

Neuronal Unit Activity and Phase Details

As shown in Table 1, area V1 can be an input neural area and its activity can be set based on the image of a camera. Neural areas V1, V2 and V4 can have six sub-areas each with neuronal units selective for color (e.g. red and green), and line orientation (e.g. 0, 45, 90 and 135 degrees). Neural areas Mic-left and Mic-right can be input neural areas and their activity is set based on inputs from microphones.

Table 1 also indicates the number of neuronal units in each neural area or sub-area ("Size" column). Neuronal units in each area apart from neural areas V1, Mic-left and Mic-right have a specific firing threshold ($\sigma$-fire), a phase threshold ($\sigma$-phase), a threshold above which voltage-dependent connections can have an effect ($\sigma$-vdep), a persistence parameter ($\omega$), and a scaling factor (g).

Table 2 shows properties of anatomical projections and connection types of the neural model. A pre-synaptic neuronal unit connects to a post-synaptic neuronal unit with a given probability (P) and given projection shape (Arbor). This arborization shape can be rectangular "[ ]" with a height and width (h×w), doughnut shaped "θ" with the shape constrained by an inner and outer radius (r1, r2), left-only (right-only) with the pre-synaptic neuronal unit only projecting to the left (right) side of the post-synaptic area, or non-topographical ("non-topo") where any pairs of pre-synaptic and post-synaptic neuronal units have a given probability of being connected. The initial connection strengths, $C_i(0)$, are set randomly within the range given by a minimum and maximum value (min, max). A negative value for $C_i(0)$, indicates inhibitory connections. Connections marked with "intra" denote those within a visual sub-area and connections marked with "inter" denote those between visual sub-areas. Inhibitory "inter" projections connect visual sub-areas responding to shape only or to color only (e.g. V4-red→V4-green, V4-horizontal→V4-vertical), excitatory "inter" projections connect shape sub-areas to color sub-areas (e.g. V4-red→V4-vertical). Projections marked # are value-dependent. A connection type can be phase-independent/voltage-independent (PI), phase-dependent/voltage-independent (VI), or phase-dependent/voltage-dependent (VD). Non-zero values for $\eta$, $\theta_1$, $\theta_2$, $k_1$, and $k_2$ signify plastic connections. The connection from V4 to IT was special in that a given neuronal unit in area IT was connected to three neuronal units randomly chosen from three different V4 sub-areas.

In this model of a neuronal unit, post-synaptic phase tends to be correlated with the phase of the most strongly active pre-synaptic inputs. This neuronal unit model facilitates the emergence of synchronously active neuronal circuits in both a simple network and in the full neural model (FIG. 1C), where such emergence involves additional constraints imposed by reentrant connectivity, plasticity, and behavior.

Synaptic Plasticity

Synaptic strengths are subject to modification according to a synaptic rule that depends on the phase and activities of the pre- and post-synaptic neuronal units. Plastic synaptic connections are either value-independent (see IT→IT in FIG. 1C) or value-dependent (see IT→S, IT→C in FIG. 1C). Both of these rules can be based on a modified BCM learning rule in which thresholds defining the regions of depression and potentiation are a function of the phase difference between the pre-synaptic and post-synaptic neuronal units (see FIG. 1C, inset).

Looking at FIG. 2, which is a diagram of a neural model using a special purpose processor, the host PC 208 can initialize the tables and the coefficients. It can then download this data to the processor 210, such as a Power PC, which can be part of the FPGA. The host PC 208 can maintain an interactive connection to the processor to monitor the network and upload the 'learned' data. In an alternate embodiment, the FPGA can act independently of a host PC.

The processor 210, such as Power PC, can provide administrative services for the network. The processor can maintain an interactive connection with the host PC 208. The processor 210 can download initial weights, PSP data, and connection tables into off-chip memory 204 and 206, such as DRAM, can also initialize the on-chip memory 202, such as Block Random Access Memory (BRAM), with the various LUTs for the equations, as well as coefficients and any indices. The processor 210 can also perform real time metrics on the health and activity of the network, i.e. databus usage, percentage of offchip connections, mean PSP values etc.

The off-chip memory 204 and 206, such as the DRAM, can hold the stored data of the neural simulation. This data can include but is not limited to the weights for the presynaptic processing, the output data, also called "Post-Synaptic Potential" (PSP) data, and the connection table that indicates the interconnection of the neural elements.

The on-chip memory 202, such as BRAM, can hold small coefficients and LUTs as well as be a FIFO for the PSP and weight data being processed by each element. In addition to the Weights, PSP data, and Connection Tables that are loaded at execution time each element can have stored locally a unique Original weight and its PSP from the previous epoch. APPENDIX II shows exemplary memory requirements for a system of one embodiment.

FIGS. 5A-5D illustrate the transfer of inputs, outputs and weights of one embodiment of the present invention. The transfers of the inputs, outputs and weights can be in a predetermined order that does not require a complex addressing scheme for the data. The inputs, outputs and weights can be transferred in the predetermined order so that the memory knows what core is the source of the data, for example. The data in the output storage tables, current weight table and connection table can be addressable according to this predetermined order. In one embodiment the data is written into these tables according to a neural element number. For example, the data can be transferred according to the order, (Core 0, timeslice 0), (Core 1, timeslice 0) . . . (Core 255, timeslice 0), (Core 0, timeslice 1) . . . (Core 254, timeslice 255), (Core 255, timeslice 255) and then loop to repeat the order for the next epoch.

Figure 5A:
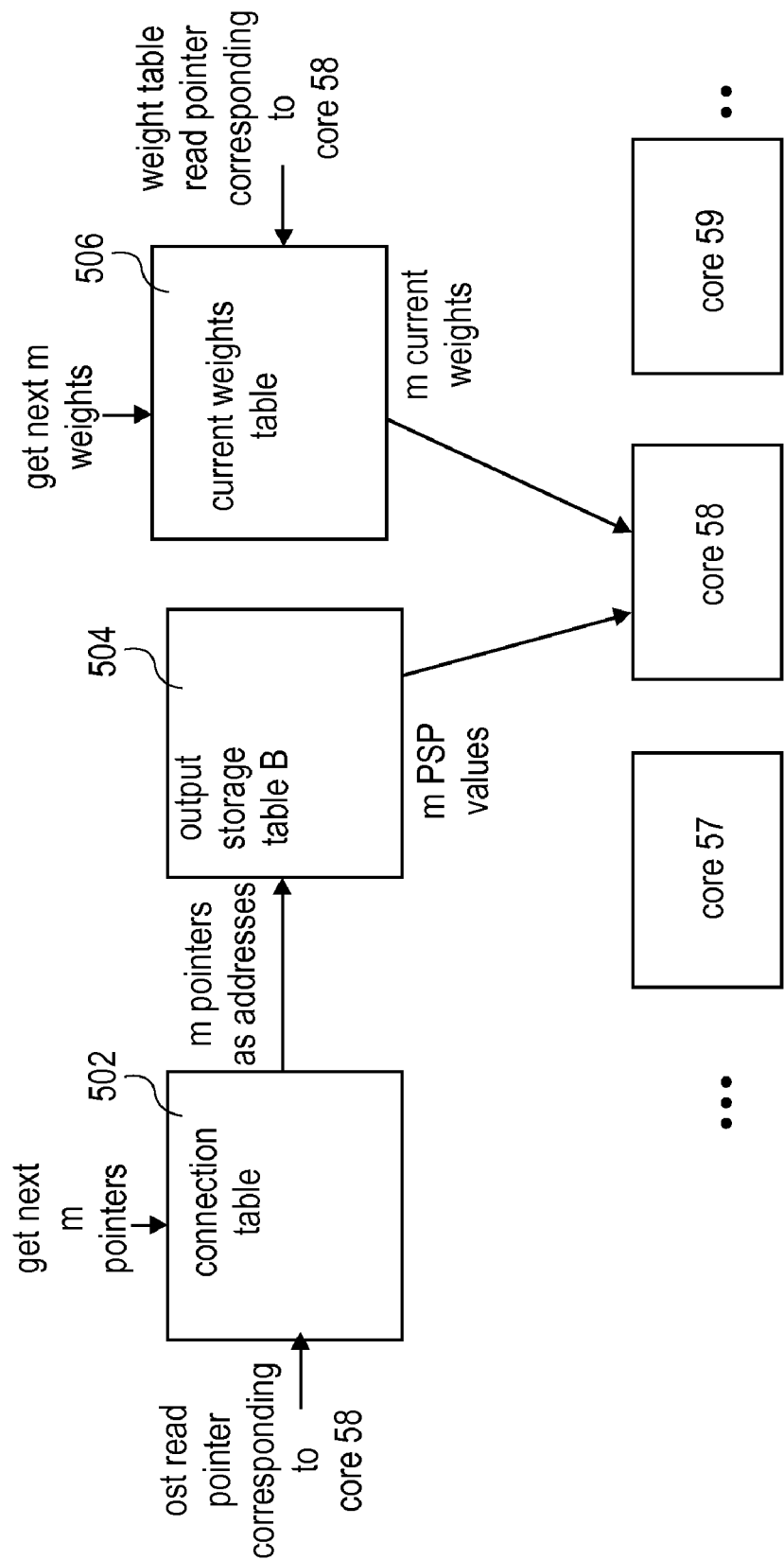
FIGS. 5A-5D are diagrams illustrating the transfer of inputs, outputs and weights in a special purpose processor of one embodiment of the present invention.
Figure 5B:
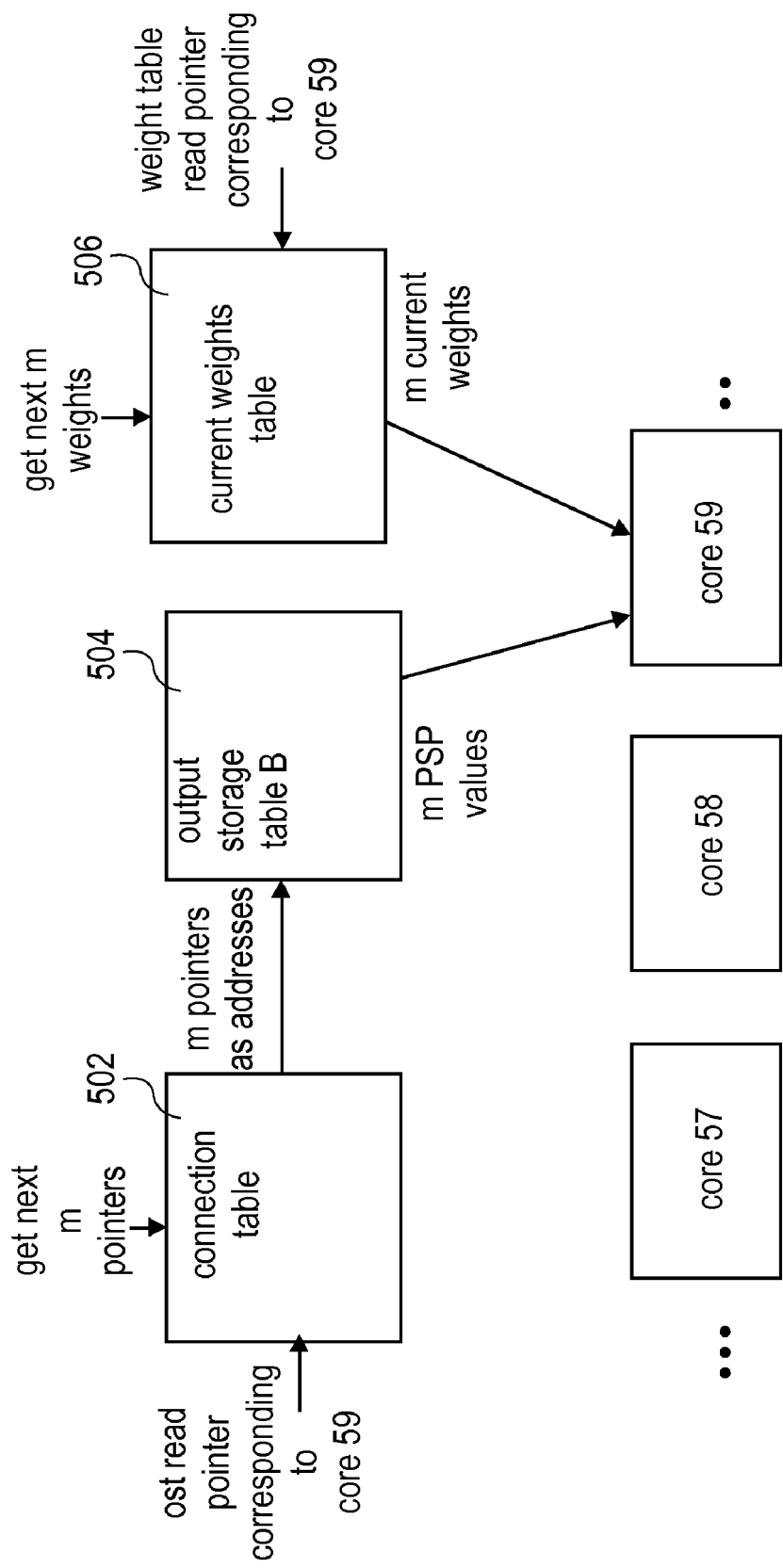

Looking at FIG. 5A, the connection table 502 can be instructed to get the next m pointers, which are the pointers to the source neural elements for the current core, in this case core 58. The m pointers from the connection table 502, indicating the source neural elements, can be sent to an output storage table 504 to get the PSP input data for core 58. The next m weights can be obtained from the current weights table 506 to be provided to the core 58. These m weights can be ordered such they correspond to the PSP input data. The m PSP values and m weights can then be processed by the core 58. FIG. 5B shows these steps repeated for core 59.

Figure 5C:
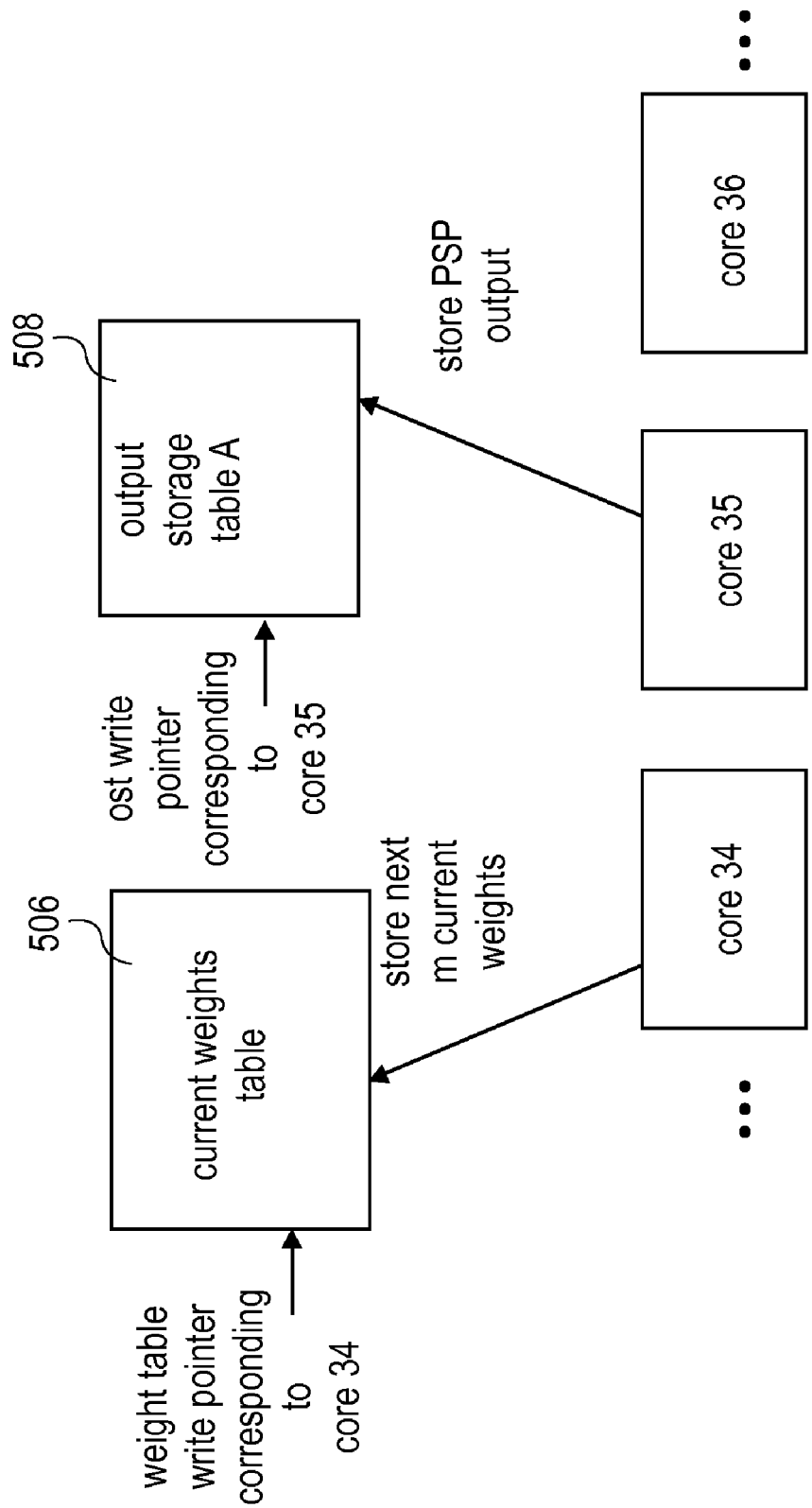
Figure 5D:
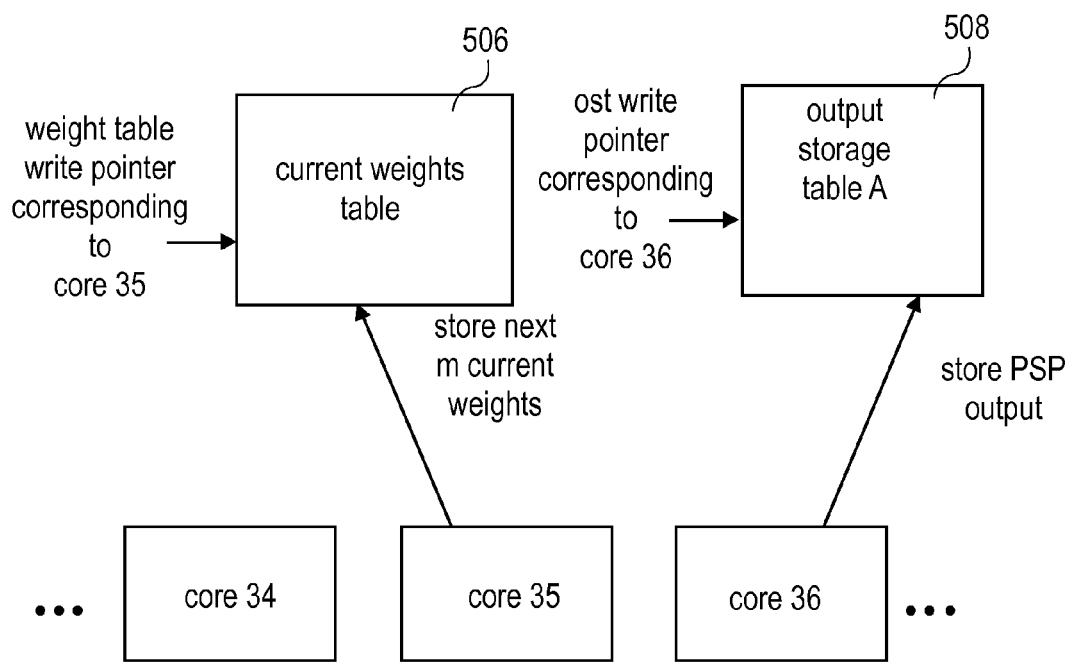

FIG. 5C shows the writing of data back to an output storage table 508 and the current weight table 506. The core can write the data to memory following the predetermined order. In the example of FIG. 5C, the output of core 35 is written into the output storage table 508 while the m updated weights of core 34 are written to the current weight table 506. FIG. 5D shows these steps repeated for the next cores.

One embodiment of the present invention is a scalable FPGA based architecture to model the neural elements and their interconnections. The architecture can simulate as many elements as possible on a single chip, and can provide an interconnection scheme to allow for connections to a large number of similar chips. The high speed of the FPGA circuitry can provide the ability to share resources to model large numbers of neural elements. The resources to be shared can include the calculating engines that perform the presynaptic (such as the sum-of-products), postsynaptic, and plasticity (such as activity-dependent and value-dependent processes) calculations. The sharing and some parallel replication of circuitry can allow for the modeling of large quantities of elements. Along with all of this, a means to preload the elements' initial conditions and read their final state of the simulation can be provided. Finally, in order to make this a useful tool for simulating a variety of neural processes, a means to reconfigure the interconnections at the beginning of the simulation can be provided.

One challenge in the design is representing all of the elemental computation units and routing the data between all the elements in the network. In one embodiment, each element can have as many as 256 inputs (and associated weights). A simple network of connections, tying together a pool of elemental computation units, would use up the available routing resources rather quickly. This approach would also require significant reconfiguring of the FPGA for each new model of interconnections.

Instead of each element having its own computation engine and all of its inputs and outputs routed individually on the chip, a scheme of shared computation engines (neural processing units, also called or NPU's or "cores") and a common data distribution bus is proposed. Over the course of a single epoch period, an individual neural element's inputs and their respective weights can be delivered to a core. The core can execute the sum-of-products, and post-synaptic and learning processes, creating a single output and updated weights for the neural element. This data set can be returned to a storage table to be used in the next epoch, while another element's data is passed to the core. Given the length of the epoch and the speed in which the core can calculate an element's processes, a single core can serve many elements. If the number of elements is increased, larger quantities of elements' calculations can be executed. In one embodiment, with 128 cores on a chip, each can serve up to 256 elements in the time period of the epoch, resulting in the simulation of 32768 neural elements. Fewer cores can be used and still permit the modeling of the same number of neural elements, if each core is shared amongst a larger number of elements.

The common data distribution bus can deliver the input values for each element along with the weight factor for each input to the assigned NPU. The weight data values can be strictly associated with each element, so they can delivered sequentially from an SDRAM large storage memory. As each element's data is needed in sequence, the SDRAM will be addressed and the data sent along the data bus to the core being used for that element. The input data values represent the outputs of other elements from the previous epoch.

In one embodiment, there can be 32768 elements on each chip which means the same number of stored values are available as possible inputs to any given element. In order to accommodate the future expansion of the simulation to include outputs from other elements located on other chips, an additional amount of storage for those off chip sourced values is needed. For now, the amount of data needed for that purpose is assumed to be no more than 32768. This gives a pool of 65536 data values to pull the inputs for the elements from. They can be kept in what are called the Output Storage Tables (OST). Each element will need up to 256 of these values, selected from throughout the data set, as e.g. element #1 could have inputs from elements 34, 456, 1093, etc., while elements #2 could have inputs from elements 1, 6, 12, 456, etc. Other configurations determined for models of other neural anatomy could redefine these connections.

Because of this, a means of supplying a list of input sources picked from among the 65536 values in the table is proposed. Another large storage SDRAM memory can be used. The SDRAM can be accessed sequentially, similar to the weight table, but the data that will be presented by each address in the SDRAM will be a pointer to the Output Storage Tables. The data in the OST will be the outputs of each element during an epoch and the data in the SDRAM, which will be static, will be a pointer to a location in the OST that holds the value to be used be the element at the time. The data in this SDRAM is called the Input Pointers. The additional advantage of this approach is that to reconfigure the neural simulation for another model involving different connections will require only reloading the SDRAM with a different set of addresses in the OST. No reconfiguration of the FPGA would be needed.

In order for a given neural system model to run on this system, the weight tables and input pointers can be loaded in SDRAM. Also, the coefficients used in the post synaptic and learning processes can be pre-loaded. A processor on the FPGA can be employed for this. As the system is powered up, the processor will load the data from files it can receive via a network connection (e.g. TCP/IP). After the data is loaded, the processor will set a flag and the neural simulation can run on its own. The sequence of fetching and loading the inputs and weights from memory can repeat for every element as output values are generated and returned to memory to be used in the next epoch. The Process will repeat as long as the experiment calls for at which point the processor can intervene to stop the process and download the data from the tables for analysis.

The success of this design relies on the ability to preconfigure the interconnections between the elements offline before the process is executed. The offline software can work through an input list of desired connections and translate these connections to the element/NPU architecture of the FPGA based system. This place-and-route tool can place elements that share many connections together in the same chip to minimize inter-chip data transfer. The tool will also need to translate that placement into a list of data values that would be loaded into the input pointer table and the off-chip link module.

The processor interface module 602 (FIG. 6) responds to the processor 604 program environment. It can be connected to the processor 604 via the on-chip peripheral bus 606 and feature an address decode space that can allow the processor 604 to set operating modes and download and upload information from the Neural Processing System registers and memory.

FMS controller module 608 can run in a continuous loop setting System Bus Addresses and other flags to actuate latches and mux's to route the data to and from the SDRAM and Output Storage Tables 610. It can be able to be started and interrupted by commands sent to the processor interface 602.

The SDRAM controller module 612 can oversee all interaction with the SDRAM. It can buffer page streams, both reading and writing, with the SDRAM. The SDRAM Controller module 612 can provide a simple synchronous port to the rest of the neural processing system 600 for reading and writing 32 bit words from or to the SDRAM's buffered data. SDRAM controller module 612 can also manage the auto-refresh cycle for the SDRAM.

The output storage table 610 can be a large block of BRAM that holds the output PSP values from the neural processes. The BRAM can be dual port, allowing reading and writing from each port. Each BRAM block can be 65,536 bytes. This number is derived from the need to store the outputs of 128 cores×256 element's outputs per each core (256 timeslices) and to store an equal number of data values from off-chip element outputs. There can be two banks of these memories; one is for storing data from the current epoch and the other is for writing the output from the current epoch. The role of each bank (reading or writing) can be exchanged with each epoch providing a so called ping-pong buffer.

Neural Processing Unit (CPU or core) 614 can include the calculation engine for the neural simulation. Each core can serve to perform the calculations for 256 neural elements. The data from the SDRAM and the PSP storage table can be routed to each core sequentially, and the core can perform the algorithm on this input data. The results of the calculations can be routed back to the memories, freeing the core up to calculate a subsequent neural element's data. One current architecture calls for 128 of these cores to be instantiated.

The system bus environment module 616 collects together the system bus access logic, providing registers and mux's to direct the data, address and control flags between the cores 614 and the output storage tables 610 and SDRAM. The system bus 618 will be the instantiated interface between the scattered NPU's and the FSM controller 608.

The off chip link module 620 can provide an interconnection to other copies of this chip, located on other boards or in future designs, collocated on the same board. The data from the PSP output storage table can be provided to this link to supply other chips and this chip can receive data from the other chips in the network via this link. A moderately fast serial link could transmit all the output data in a 256 chip network within the epoch time allotted.

The program flash memory interface module 622 can be an Embedded Development Kit (EDK) library module which can provide interface to a program storage space for the processor software. It can be a OPB peripheral in the EDK design environment.

The TCP/IP Link module 624 can be another EDK Library module, providing a path between the processor and Ethernet connection hardware on the PC board that holds the system.

Figure 7:
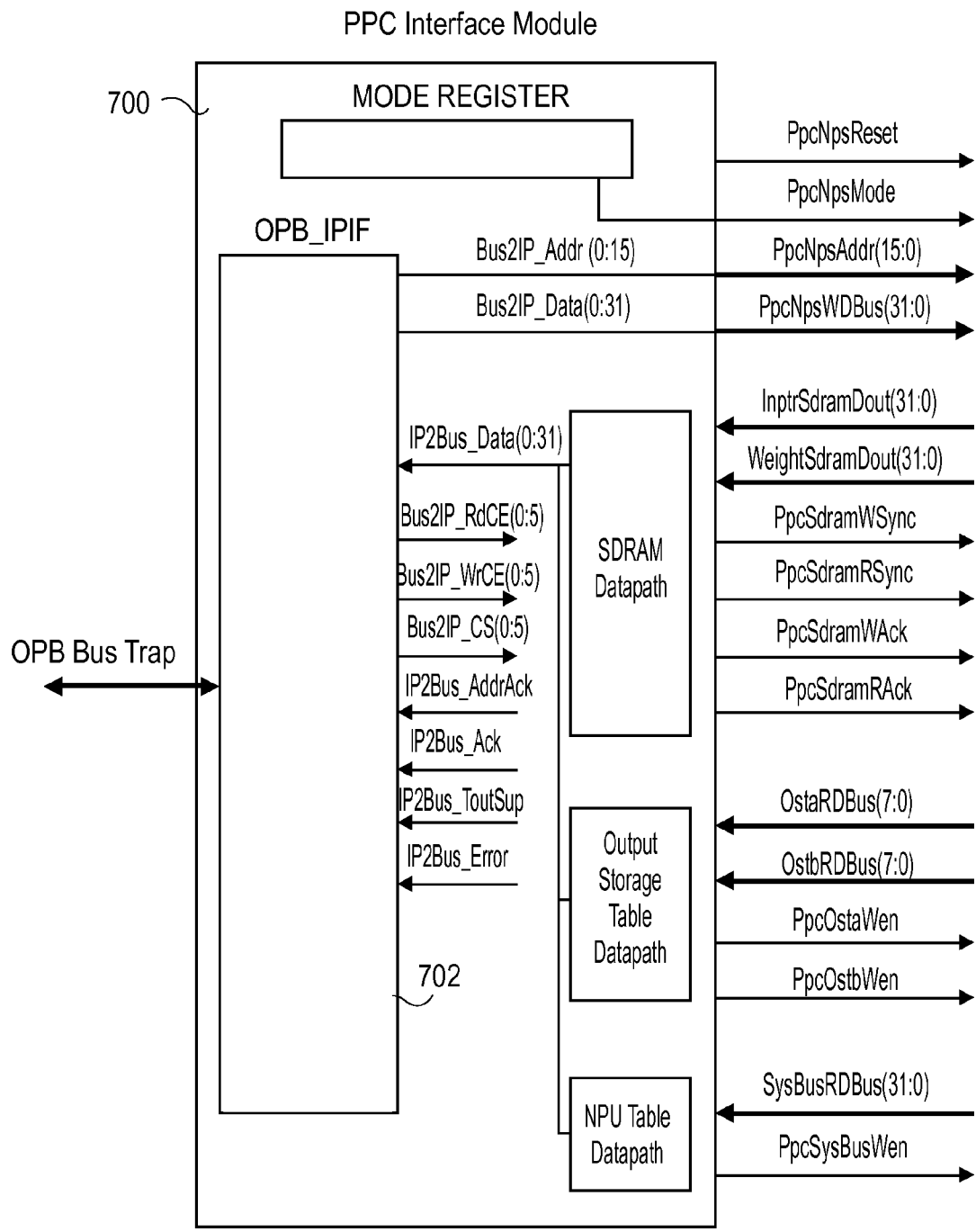
FIG. 7 is a diagram of a processor interface module of one embodiment.

This processor interface module 700 is shown in FIG. 7. This module is designed to be a custom IP in the Xilinx EDK environment. It can have a PLB interface to allow the processor interaction. A 32 bit mode register can allow the processor to set modes in the cores. The module can route data to and from the processor to the cores via the system bus, the OST's and the SDRAM which holds the weights and the pointers to the OST for the elemental inputs.

The EDK environment that the chip will be developed in provides library functions for interfacing to the processor internal bus structure. The OPB can be used for this interface. A library module for that facilitates linking custom logic to the OPB can be employed. It is shown above as OPB_IPIF. On its left in the sketch the OPB interface is given, on the right are the various signals that need to be translated into the system space. The functions of this module can be mapped to address space in the processor through parametric definitions in the OPB_IPIF module 702. The OPB_IPIF module 702 can generate one of many chip enable flags depending on which addresses the processor targets. Address banks can be allotted for:

Mode register access
Input pointer SDRAM access
Weight SDRAM access
OSTA access (on-chip outputs)
OSTB access (off-chip outputs)
NPU constants access (via the NPS system bus)

Writing to the Mode register can set flags to direct the flow of data in the system and set the FIFO sync flags indicated for the SDRAM access. The interaction with the SDRAM can leverage the FIFO's built into the SDRAM controller module. Data can be burst to the SDRAM controllers sequentially, with no addressing requirements from the OPB_IPIF module 702. The software can stream the data to the SDRAM according to the intended address sequence. PpcSdramxAck flags can be sent to the SDRAM controller to increment the FIFO's address counters. Two separate addresses in the processor space can be used, one for the input pointers and the other for the weights.

The interaction with the Output Storage Tables (OST) can be through direct addressing with a 16 bit address. These writes and reads on the part of the PPC can be either burst or single beat transactions (TBD). An addressing scheme to the OST can be used, either provided by the processor through the bus or via a sequential counter in this module. The last connection for this module is to the cores, to load their initial states and constants. This can involve writing to the BRAM blocks located in each NPU via the system bus. The addressing of each location can be determined by the processor, although, there will be opportunities for burst mode writing and sequential addressing could permit a counter addressing scheme as well. A provision for reading through this connection may also use error detection and final state downloading of some possible non-static data in the cores.

Figure 8:
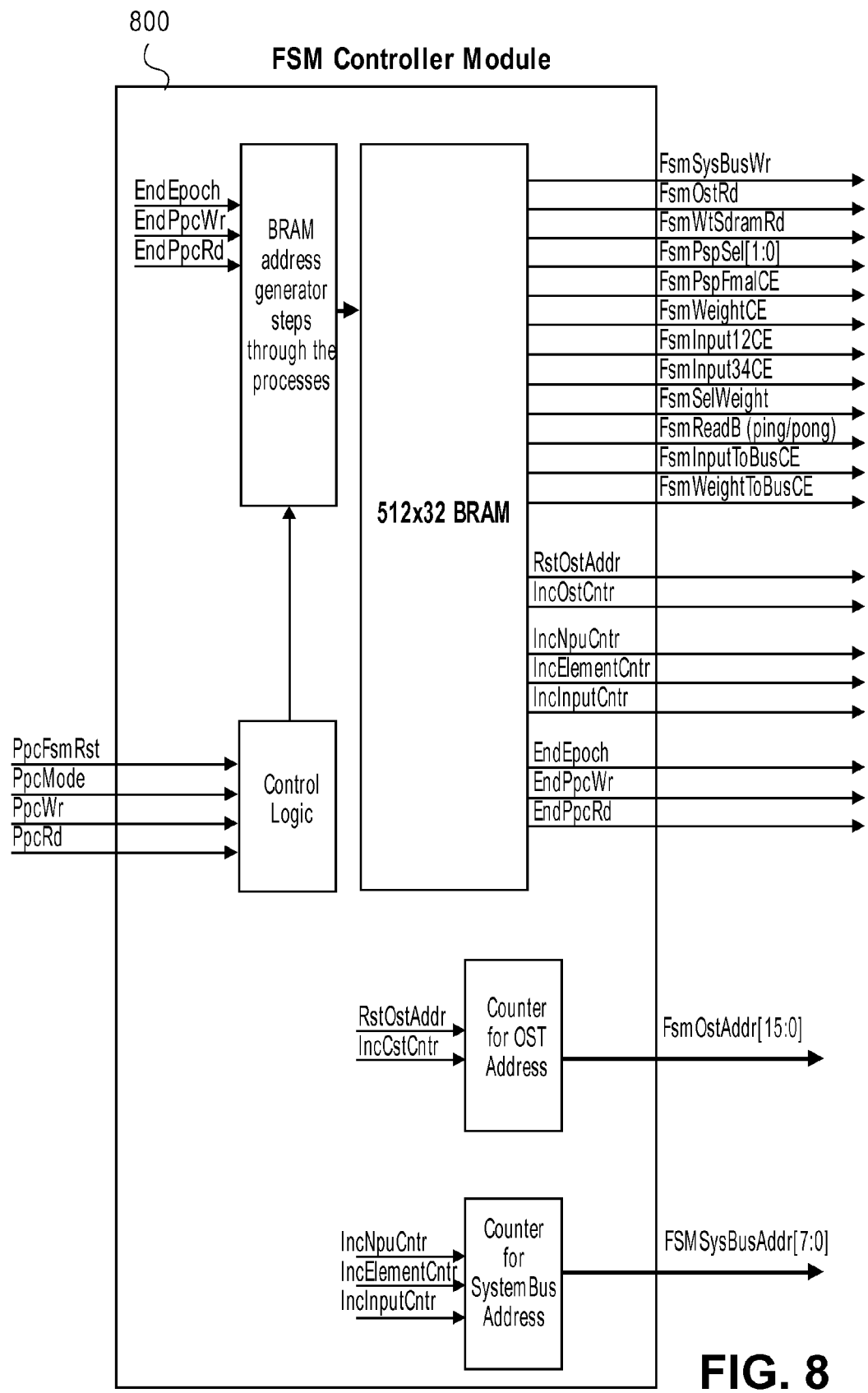
FIG. 8 is a diagram of a finite state machine controller of one embodiment.

A FSM module 800 is shown in FIG. 8. The FSM module 800 can control the neural processing cycle. The FSM module 800 can repeat the sequence of memory read, system bus write, system bus read and memory write steps needed for loading and unloading the element data and weights. The FSM module 800 can count through the elements and cores, setting addresses in the output storage table and on the system bus as needed for each element. The FSM module 800 overall process cycle time counts through all the elements and takes one epoch time period.

The FSM Controller module 800 can do the following tasks:

Count through the steps, elements and cores of the epoch,
Provide the necessary sequence of flags for pipeline registers, memory and system bus accesses,
Provide needed addresses for the output storage table and system bus devices,
Possibly provide sequencing for processor streaming access.

At the start of an epoch, the FSM controller module 800 can trigger a reset in each SDRAM control module to set their address generators to the top of memory. The SDRAM controllers can flag the FSM controller 800 when they have data ready to read in their FIFO's. At this point the FSM controller

800 can start the sequence of flags that will pass the data through the pipeline, steering various mux's that present the data to the system bus. The input pointer data from one of the SDRAM's is routed to the address line of the output storage table BRAM to select the correct data to be used as the inputs to the core processes. The FSM controller 800 can steer the output of one of its counters to the system bus address lines to signal which NPU's will receive the data. A system bus read can also occur to take from the cores their output data. The FSM will step this data through the pipeline to the SDRAM controller or OST, depending on the source. This cycle can be repeated for all 256 inputs of the selected elements. Then the element loading/unloading process is repeated for all 256 elements of each of the 128 cores. An additional possible role for the FSM controller module 800 is to execute the sequencing of pipeline pulses and mux select lines for processor reads and writes. A simple finite state machine along with several counters can be used to achieve the sequence. However, the process can require numerous flags to control the pipeline registers and counters. One approach to assuring that all of the required flags are synchronous is to place the state machine in a BRAM. The BRAM can hold the output flag sets in its 32 bit wide cells. The control of the FSM then would be realized by clocking through the addresses of the FSM BRAM, sending out the desired flags as bits in the BRAM output data. A 512×32 BRAM would provide 32 flags to be used for both external pipeline control (approx. 16 needed) and internal state machine loop control.

The Neural Processing Unit (FIG. 1A; also Neural Processing System (NPS) or "neural core") can store its weight data in SDRAM. The SDRAM can also hold pointers to the output storage table data. The data can be streamed sequentially to and from memory in large blocks at system bus speeds of 125 MHz. The SDRAM access can accommodate this high speed access if it is read or written in page bursts of 512 words. Accessing the memory in this fashion can reduce the time spent in CAS latency and other timeouts. The data use in the system can be compatible with this as it can be accessed sequentially and the return values for writing can also be presented in the same sequence. The SRAM controller, besides providing the standard sequenced pulses for synchronous control of the SDRAM I/O, can also provide a means of buffering the streamed pages of data both on their way to and from the memory. In this manner, the system can access the data in a less continuous manner than the page streaming provides. There can be two instantiations of this memory controller, each driving two memory chips configured into 32 Mb blocks. The memory used can be the HYB25L128160AC-8 from Infinion which is compatible with the signals and their timing. All read, write and auto-refresh commands can be designed per the data specifications for this memory. The memory is configured as a 32 Mb block. The controller can be initially implemented in a Xilinx X2VP50F1152 on a pre-existing demo board. The pin connections from the Xilinx part to the memory parts can be pre-assigned.

Figure 10:
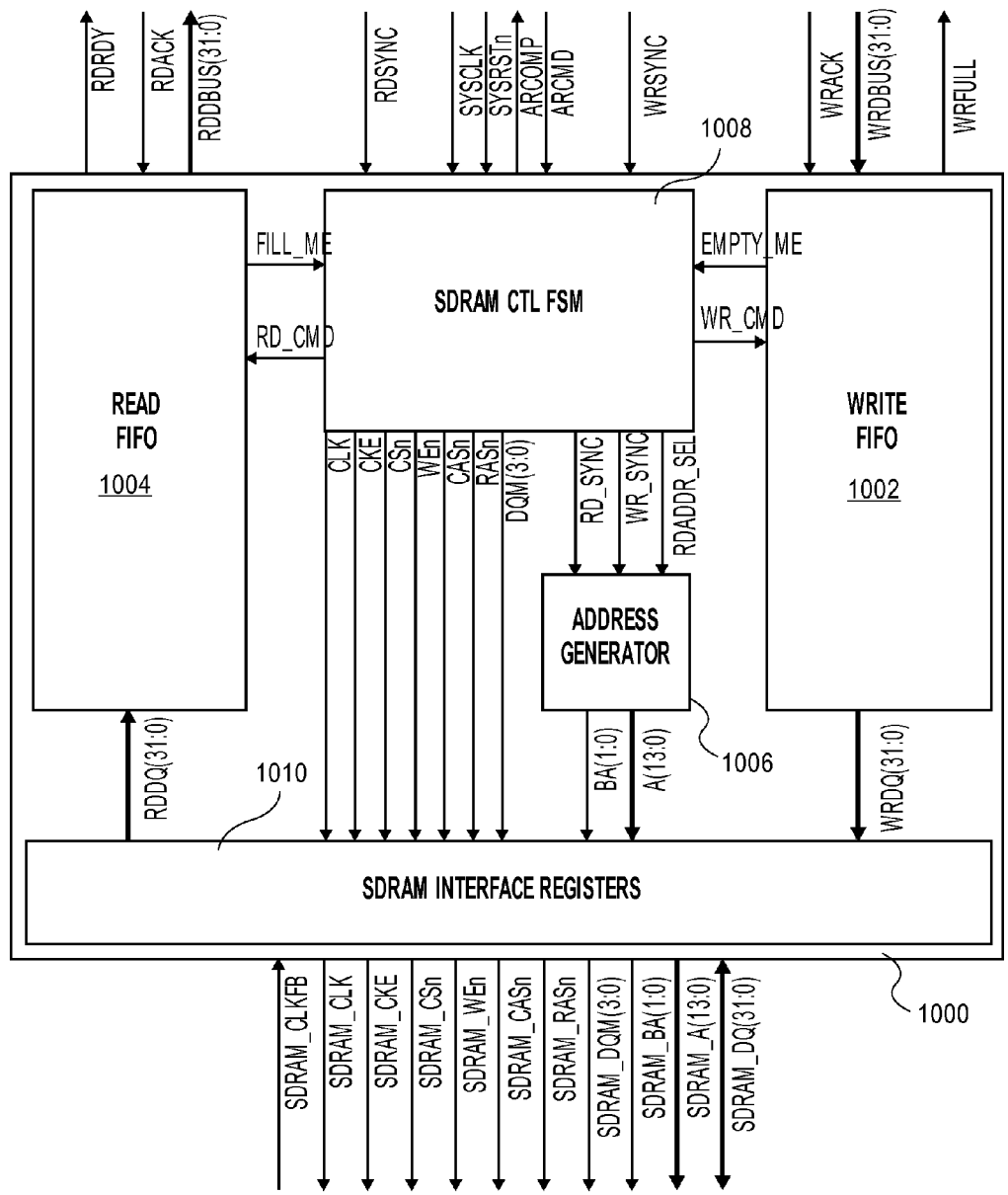
FIG. 10 is a diagram of an SRAM controller of one embodiment.

The cores can be the primary user of the data from the SDRAM. The cores can use effectively continuous streaming of data from the SDRAM via this SRAM controller (FIG. 10). The data can be sequential from the memory (no random access). When the RDACK flag is high, during a rising edge of the system clock, the data on the read bus should be valid. On a subsequent rising edge of the clock with the RDACK flag high, the next data word from the memory should be available. The controller can provide data under a condition of the RDACK being high continuously, supplying data sequentially at the system clock rate of 125 MHz. There can be breaks in the reading, enough for the controller to supply subsequent pages to a read buffer. In addition, the controller can accept a data word on the write bus when the WRACK flag is high during a rising edge of the system clock. The controller can receive a continuous stream of data from the write bus when the WRACK flag is high continuously. There can be breaks in the writing, enough for the controller to empty pages from a write buffer to the SDRAM. The controller can be able to process the read and write requests, buffering the data as needed, while at the same time pulling data from the SDRAM or writing it to the SDRAM as needed. The overall system timing can mean that the access to the SDRAM be page mode, therefore, it is anticipated that buffering can be provided for both directions. Overall system timing can be provided for alternating page write/page read access to the SDRAM where needed as well as for accommodation of pipeline loading at the beginning and end of any cycle.

Figure 9:
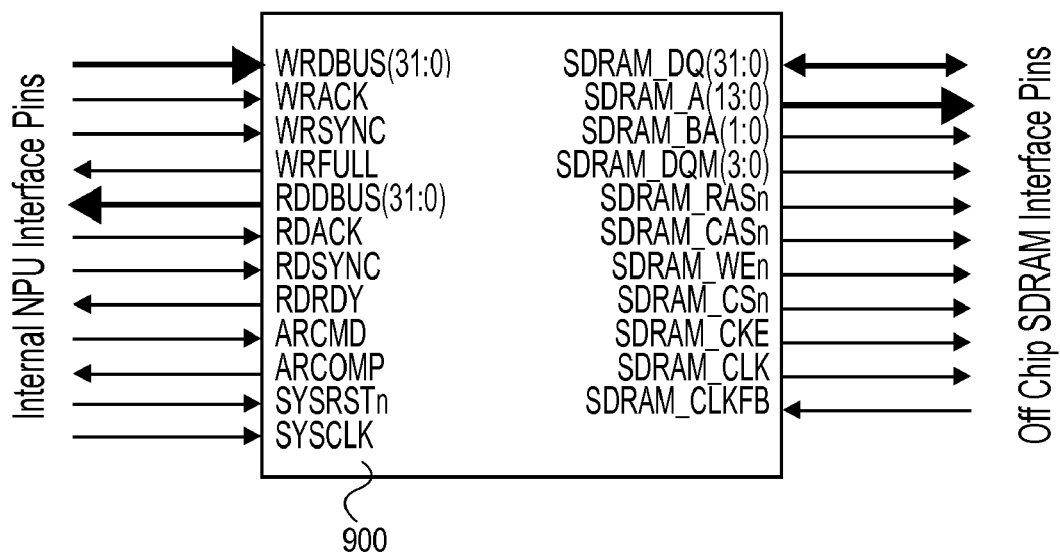
FIG. 9 is a diagram that shows a pin arrangement for the SRAM controller module of one embodiment.

FIG. 9 shows a pin arrangement for the SRAM controller module 900.

The following chart lists the pins and their descriptions of one embodiment.

| Pin Name | Input/Output | Description |
| --- | --- | --- |
| SDRAM Interface Pins | | |
| SDRAM_DQ(31:0) | I/O | Data bus in/out of SDRAM |
| SDRAM_A(13:0) | O | Address Bus to SDRAM |
| SDRAM_BA(1:0) | O | Bank Select to SDRAM |
| SDRAM_DQM(3:0) | O | Data mask to SDRAM |
| SDRAM_RASn | O | Row address select to SDRAM - active low |
| SDRAM_CASn | O | Column address select to SDRAM - active low |
| SDRAM_WEn | O | Write enable command to SDRAM - active low |
| SDRAM_CSn | O | Chip select to SDRAM - active low |
| SDRAM_CKE | O | Clock enable to SDRAM |
| SDRAM_CLK | O | Phase corrected clock to SDRAM |
| SDRAM_CLKFB | I | Feedback from SDRAM clock trace for DCM |
| NPU Interface Pins | | |
| WRDBUS(31:0) | I | Data bus from NPU |
| WRACK | I | Flag indicates data on WRDBUS is to be written |
| WRSYNC | I | Optional command flag from NPU to synchronize write addresses to 0 |
| WRFULL | O | Flag from SDRAM control module indicating that the WR FIFO is full. Probably indicates an error has occurred |
| RDDBUS(31:0) | O | Data bus from controller to NPU |
| RDACK | I | Flag from NPU indicating the data was read |
| RDSYNC | I | Optional command flag from NPU to synchronize read addresses to 0 |
| RDRDY | O | Flag from controller indicating that the NPU can start reading data from the FIFO. |
| ARCMD | I | Optional external command to the SDRAM controller to prompt the start of an auto-refresh cycle. |
| ARCOMP | O | Optional flag from the controller indicating the commanded auto-refresh is complete |
| SYSRSTn | I | Global reset - low means reset active |
| SYSCLK | I | Global 125 MHz clock |

The following tables indicate the off chip pin numbers on a Veritex™ II Xilinx FPGA. Since there are 2 instantiations of the controller, 2 sets of pin numbers are given. In each table the top row is the pin name (without the SDRAM_prefix) and the second row is the pin number on the FPGA.

| Module 1 Pinouts | | | | | | | | | | | | | | |
|---|---|---|---|---|---|---|---|---|---|---|---|---|---|---|
| CSn | CKE | RASn | CASn | WEn | CLK | | | | | | | | | |
| P5 | P6 | U5 | R7 | T5 | T7 | | | | | | | | | |
| DQM | 0 | 1 | 2 | 3 | | | | | | | | | | |
| | K4 | H2 | P3 | N2 | | | | | | | | | | |
| BS | 0 | 1 | | | | | | | | | | | | |
| | J7 | R6 | | | | | | | | | | | | |
| A | 0 | 1 | 2 | 3 | 4 | 5 | 6 | 7 | 8 | 9 | 10 | 11 | 12 | 13 |
| | T6 | M6 | L5 | U6 | M7 | F7 | L6 | L7 | N7 | N6 | N5 | R9 | P7 | U7 |
| DQ | 0 | 1 | 2 | 3 | 4 | 5 | 6 | 7 | | | | | | |
| | M3 | F5 | N4 | F4 | M4 | K5 | L3 | L4 | | | | | | |
| DQ | 8 | 9 | 10 | 11 | 12 | 13 | 14 | 15 | | | | | | |
| | H1 | K2 | J2 | L2 | K1 | M2 | L1 | M1 | | | | | | |
| DQ | 16 | 17 | 18 | 19 | 20 | 21 | 22 | 23 | | | | | | |
| | R3 | T3 | T4 | U3 | U4 | P4 | N3 | R4 | | | | | | |
| DQ | 24 | 25 | 26 | 27 | 28 | 29 | 30 | 31 | | | | | | |
| | N1 | P1 | P2 | R1 | R2 | U2 | T2 | V2 | | | | | | |

| Module 2 Pinouts | | | | | | | | | | | | | | |
|---|---|---|---|---|---|---|---|---|---|---|---|---|---|---|
| CSn | CKE | RASn | CASn | WEn | CLK | | | | | | | | | |
| AB5 | AB6 | AH5 | AC6 | AD8 | AC7 | | | | | | | | | |
| DQM | 0 | 1 | 2 | 3 | | | | | | | | | | |
| | Y3 | W2 | AD3 | AD1 | | | | | | | | | | |
| BS | 0 | 1 | | | | | | | | | | | | |
| | V6 | AD5 | | | | | | | | | | | | |
| A | 0 | 1 | 2 | 3 | 4 | 5 | 6 | 7 | 8 | 9 | 10 | 11 | 12 | 13 |
| | AD6 | W5 | V5 | AH8 | Y6 | V7 | W6 | W7 | Y7 | AA6 | AA5 | AB7 | AA7 | AD7 |
| DQ | 0 | 1 | 2 | 3 | 4 | 5 | 6 | 7 | | | | | | |
| | AB3 | V4 | AB4 | W3 | AA4 | W4 | AA3 | Y4 | | | | | | |
| DQ | 8 | 9 | 10 | 11 | 12 | 13 | 14 | 15 | | | | | | |
| | Y1 | AA1 | Y2 | AB1 | AA2 | AC1 | AB2 | AC2 | | | | | | |
| DQ | 16 | 17 | 18 | 19 | 20 | 21 | 22 | 23 | | | | | | |
| | AE4 | AF4 | AF3 | AK4 | AK3 | AC4 | AC3 | AD4 | | | | | | |
| DQ | 24 | 25 | 26 | 27 | 28 | 29 | 30 | 31 | | | | | | |
| | AD2 | AE2 | AE1 | AG1 | AF2 | AL1 | AG2 | AL2 | | | | | | |

The SDRAM controller 1000 of FIG. 10 can be comprised of these five modules:

SDRAM registered outputs 1010
Write FIFO 1002
Read FIFO 1004
Address generator 1006
Controller finite state machine 1008

The SDRAM Interface Registers 1010 can be as a Xilinx I/O block clocked to provide the correct timing to the SDRAM chip (90~180 clock phase shift). Optional clock feedback may be used with a Delay Control Module (DCM) if more sophisticated clock control is needed. The bi-directional port for the data can also be de-mux'd in this block.

The Write FIFO 1002 can be at least 512 words deep (possibly 1024) and can buffer the data in from the core until enough data to stream a page is stored. At that point it can send an "Empty_Me" request to the controller 1008. The controller 1008, after accommodating any arbitration it may be doing, can send the necessary sequence of commands to the SDRAM for page writing, while strobing the FIFO to write its output to the SDRAM 1000. The FIFO 1002 will be realized with dual port BRAM in a Xilinx chip.

The Read FIFO 1004 can be at least 512 words deep (possibly 1024) and can supply data per core read requests until its data level is low enough to receive another page from the SDRAM 1000. When its contents are low enough to accommodate another 512 word page burst from the SDRAM, it can send a "Fill_Me" request to the controller 1008. The controller 1008, after accommodating any arbitration it may be doing, can send the necessary sequence of commands to the SDRAM 1000 for page reading, while strobing the FIFO 1004 to read its input from the SDRAM. The FIFO 1004 can be realized with dual port BRAM in a Xilinx chip.

The Address Generator 1006 can keep a row-to-be-written and row-to-be-read value in its registers, incrementing each after a page is written or read. A sync input can allow for the resetting of these addresses in the event of a fault or at power up or just periodically to assure synchronicity. An additional provision can be a mux to select per command from the controller, whether the write address or read address is to be sent to the SDRAM 1010. The address generator can also provide the command value to the SDRAM during power-up mode register loading of the SDRAM. This can be done through an additional command from the controller 1008.

Finally, the Controller Finite State Machine 1008 can arbitrate the FIFO service commands and initiate page streams to or from the SDRAM 1010 per the timing requirements of the SDRAM. It can also initiate auto-refresh cycles either through an internal timer or per an external command from the core. Depending on the needs to provide synchronizing, the controller may also respond to the sync pulses from the core and either pass them to the address generator or perform a more elaborate process as determined upon further system analysis.

Figure 11:
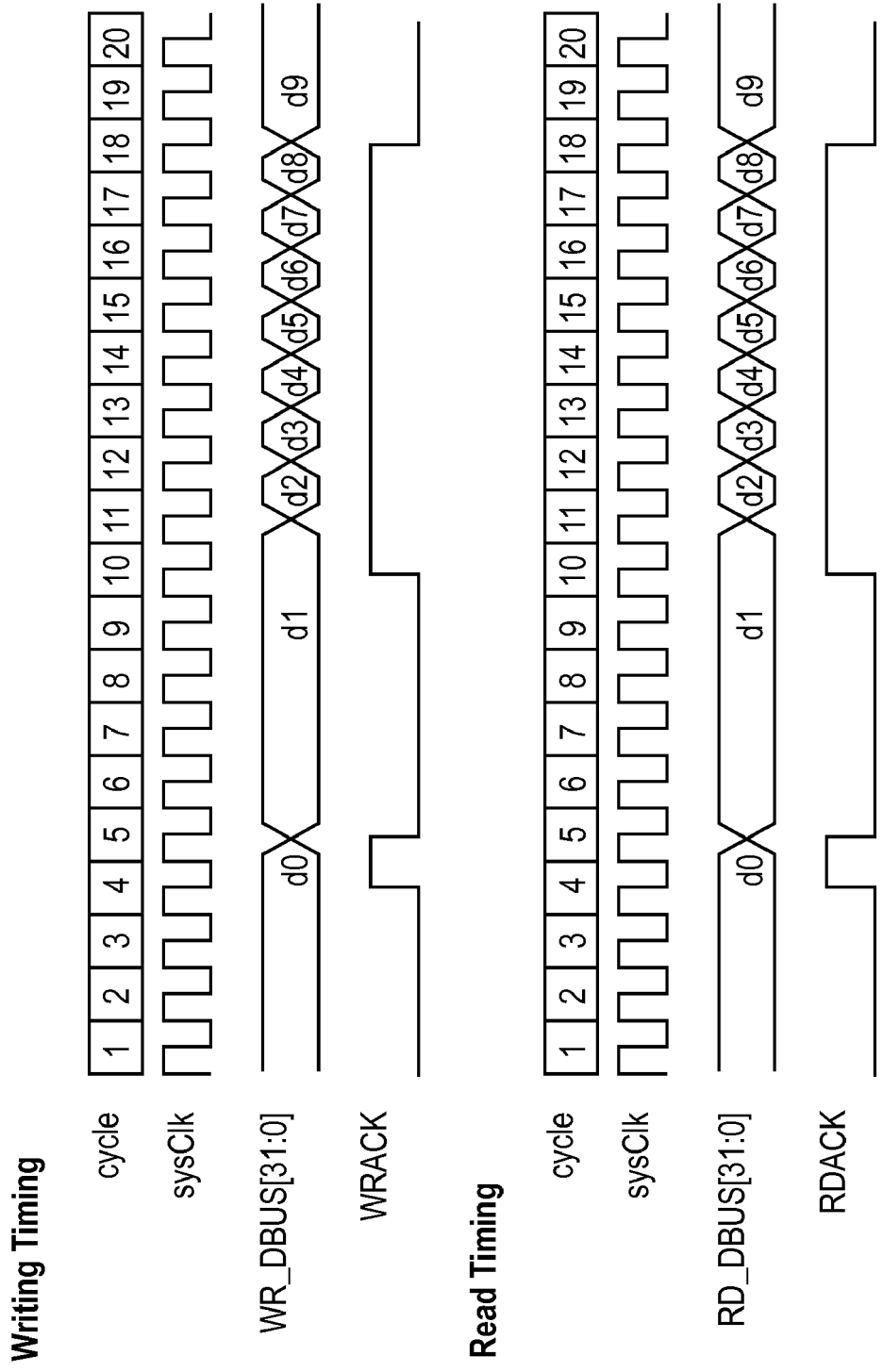
FIG. 11 are exemplary read and write timing diagrams for the core.

FIG. 11 shows exemplary read and write timing diagrams for the core. The SDRAM interface timing can be per the data sheet for the device that is being used. For the core side the timing diagrams of FIG. 11 give an idea of the WRDBUS vs. WRACK and RDDBUS vs. RDACK.

Figure 12:
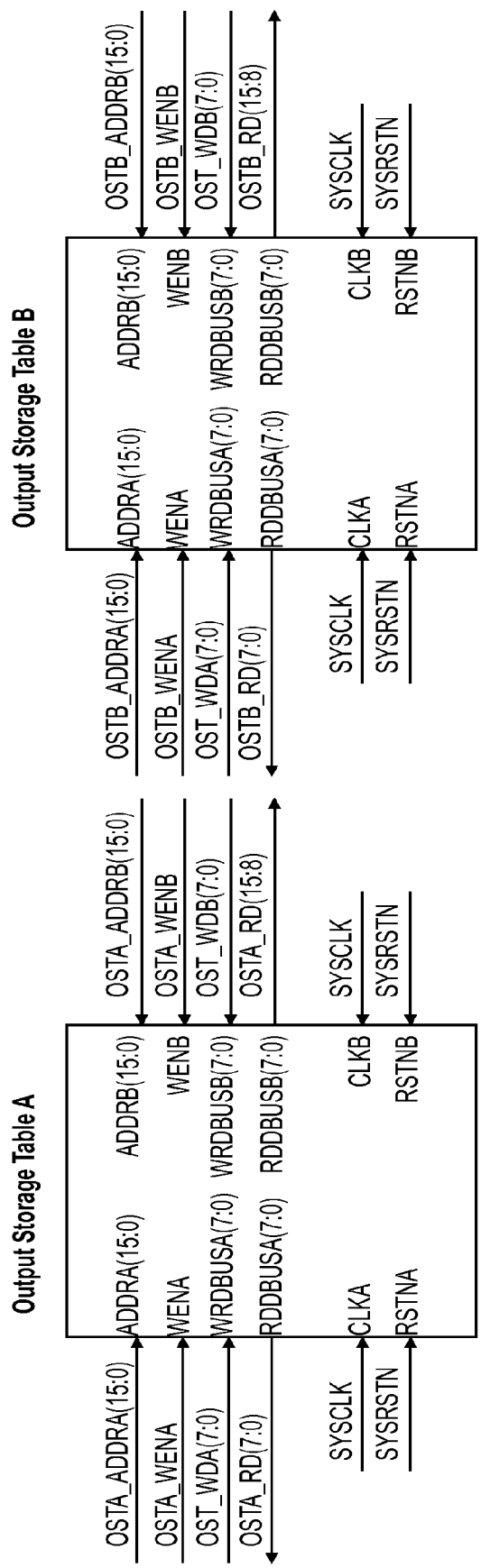
FIG. 12 is a diagram of output storage tables of one embodiment.

During the execution of the neural simulation process, the neural elements can require input data that represents the output signals from other neural elements generated in the previous epoch. On each chip, there can be 32,768 elements. That represents 256 elements assigned to each of 128 NPU's. Each of these elements can generate a single output that will be used as an input for other elements in the subsequent epoch. The output storage tables can store all of the data used by the elements on the chip. It can feature a section that holds the output data from the elements on the chip and it can also have a section that holds output data from other chips that will be used as input data for the elements on this chip. The data can be byte sized. In order to hold the outputs of all the elements on the chip the size can be 32 kB. Data from off chip elements can provide an additional 32 kB, so the overall size can be 64 kB. Since the neural simulation system can be generating outputs at the same time that it is using inputs for the current epoch, a ping-pong buffer scheme can be used to provide a memory to write to while the current epoch uses data that was written in the previous epoch from a separate memory. This can double the memory requirement to 128 kB. This memory can be organized as two 64 kB BRAM tables. Each table can use 32 BRAM blocks. In the ping-pong scheme, the 2 tables can be in either a read phase or a write phase. In order to maximize the access speed to feed the inputs to the elements, the output storage table BRAM can be configured as dual port. A byte can be read from each port simultaneously during the read phase. During write phase, one side of the dual port access can be used for writing the outputs of the current epoch, while the other side can be used for writing the output data from the off-chip elements that is used on the chip. Each table can be generated using a Core-generator of the Xilinx tools. The block and its I/O appear in FIG. 12.

Figure 13:
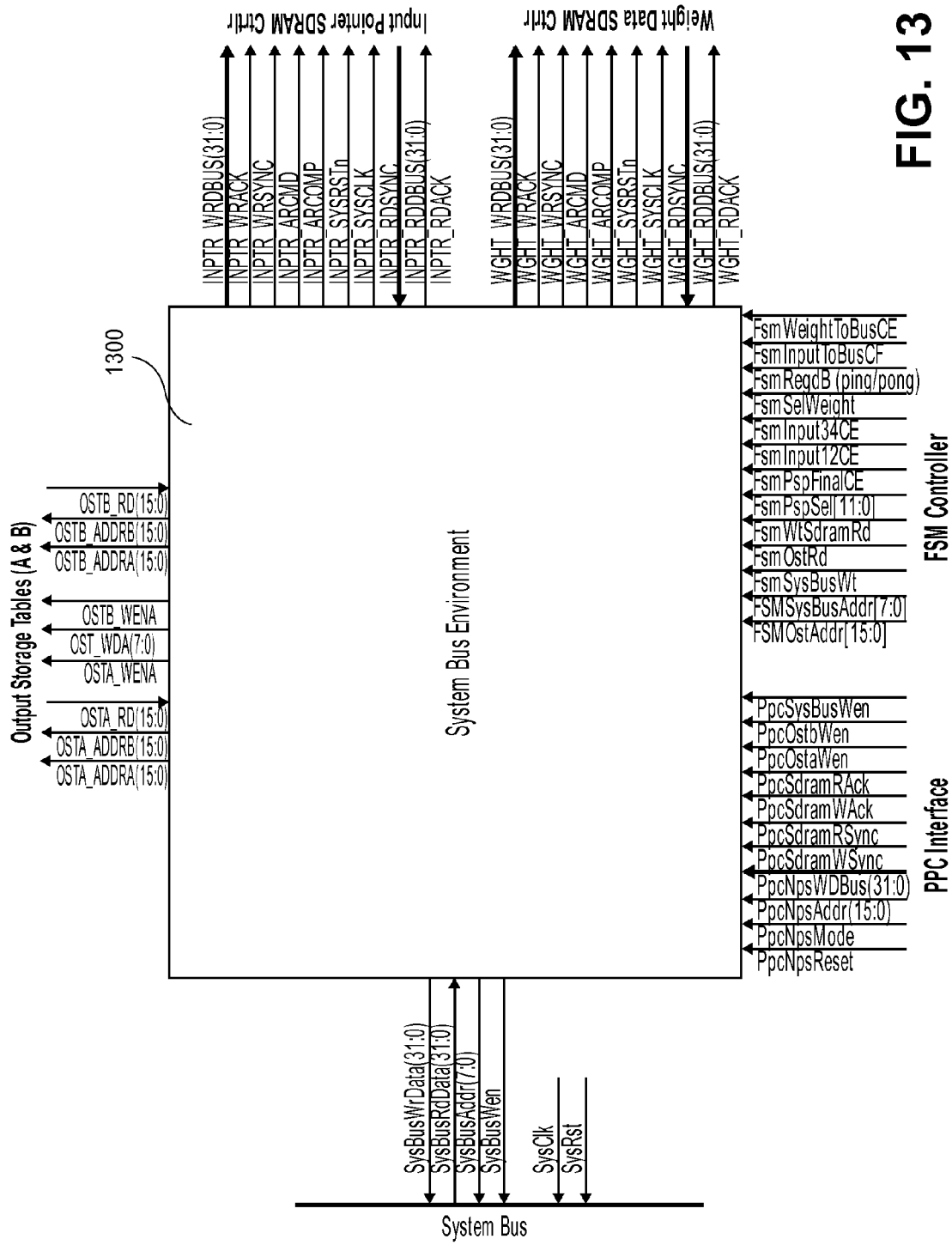
FIG. 13 is a diagram of a system bus environment module of one embodiment.

FIG. 13 shows a system bus environment module 1300. This module 1300 can hold the miscellaneous routing facilities for connecting the data between the memories and the system bus. It also can define the pipelines that have been designed in to pass the data along between its various endpoints. In terms of number of signals it is the most complex, but the logic can be relatively simple, involving a collection of mux's and registers and flags. FIG. 13 shows the inputs and outputs.

There can be four main data paths through this block which will be discussed individually. These four paths are:
  OST and weight data to the System bus
  OST and weight data from the System bus
  PPC data writing
  PPC data reading.

Figure 14:
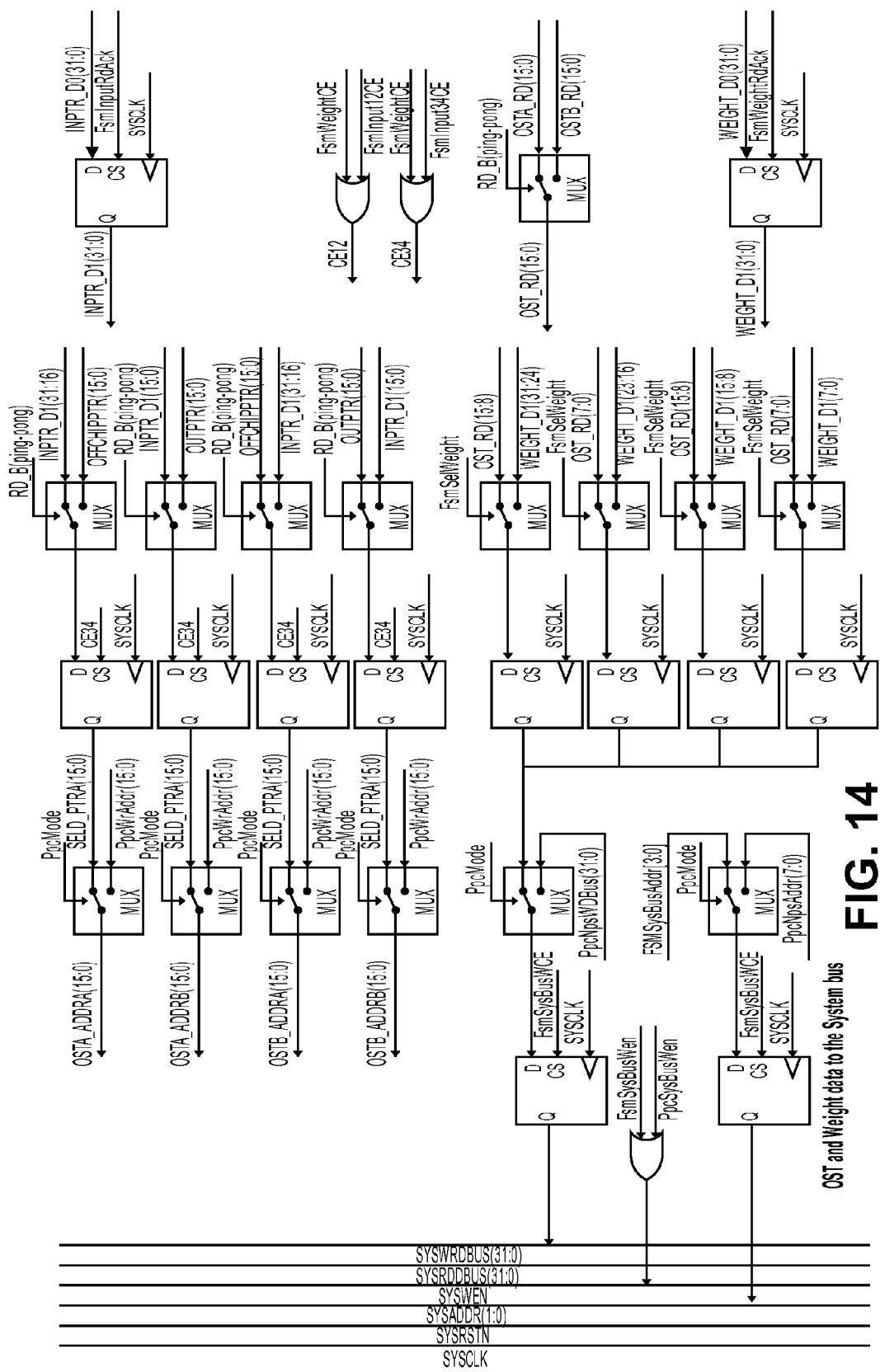
FIGS. 14 and 15 are diagrams illustrating data paths of one embodiment.

In the OST and weight data to the system bus path, the data is retrieved from memory and sent to the system bus. For this path, the weight and OST data are handled differently. The weight data is read directly from its SDRAM. For the OST data the input pointer SDRAM is first read. The data record obtained from the SDRAM holds 2 16 bit values. Each of these 'pointers' is used to address the OST, with one 16 bit pointer addressing the A port on the OST and the other pointer addressing the B port. These addresses will be applied to the appropriate memory, depending on the 'ping-pong' selection described above. Since 4 elements are served with each System Bus write and each address in the OST only holds 1 value, it can take 2 OST accesses to get the 4 bytes needed for the system bus write. The OST data can then be available with the weight data to be sent to the system bus via an additional register. There can be an intervening mux and register that permits the PPC data to be sent to the system bus when that mode is active. The address for the write to the system bus, which selects which of the cores the data will be written, is applied to the bus by the FSM controller, via a mux which selects between the FSM address or the processor address, and a register. An example of this process is shown in FIG. 14.

Figure 15:
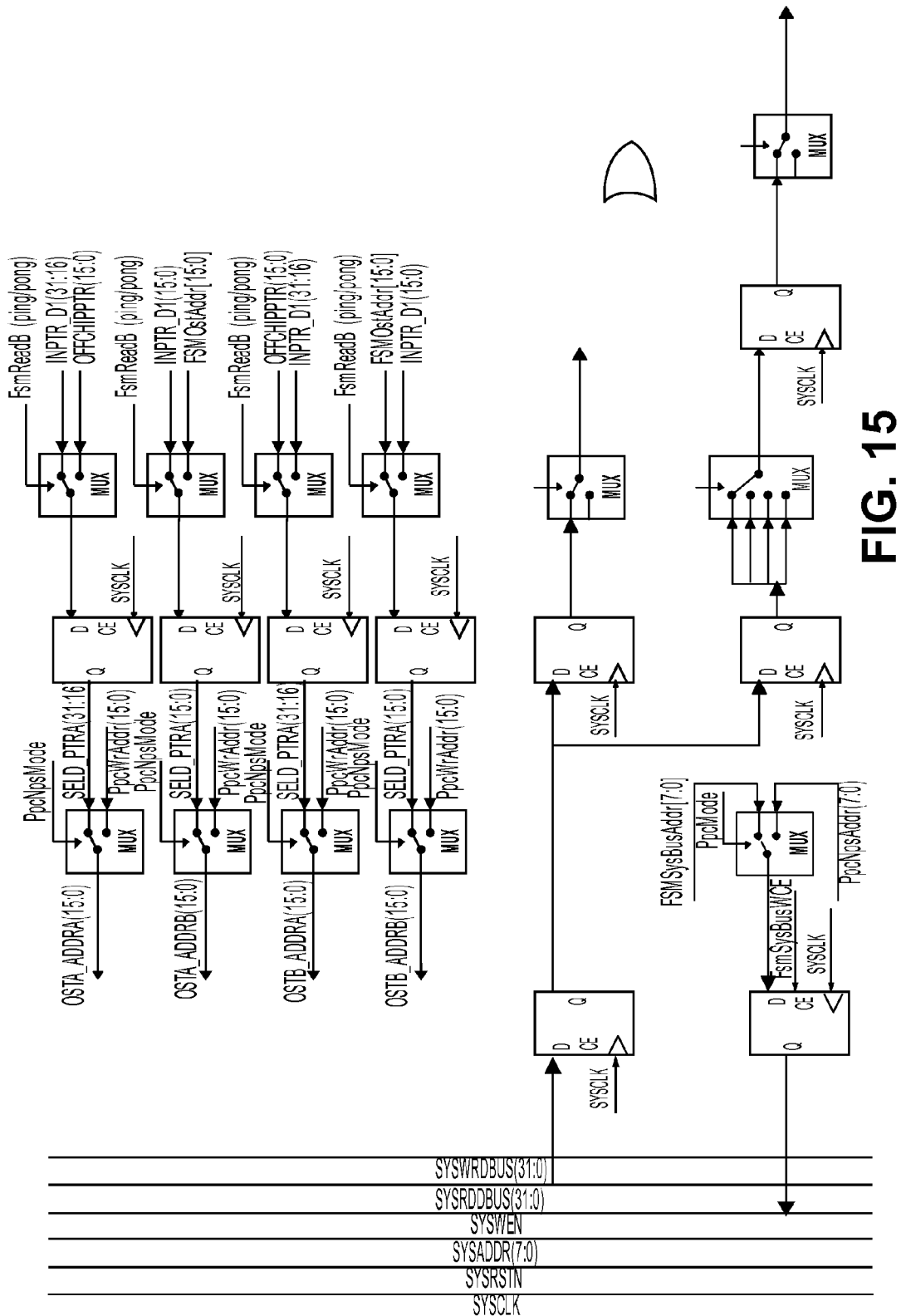
Figure 16A:
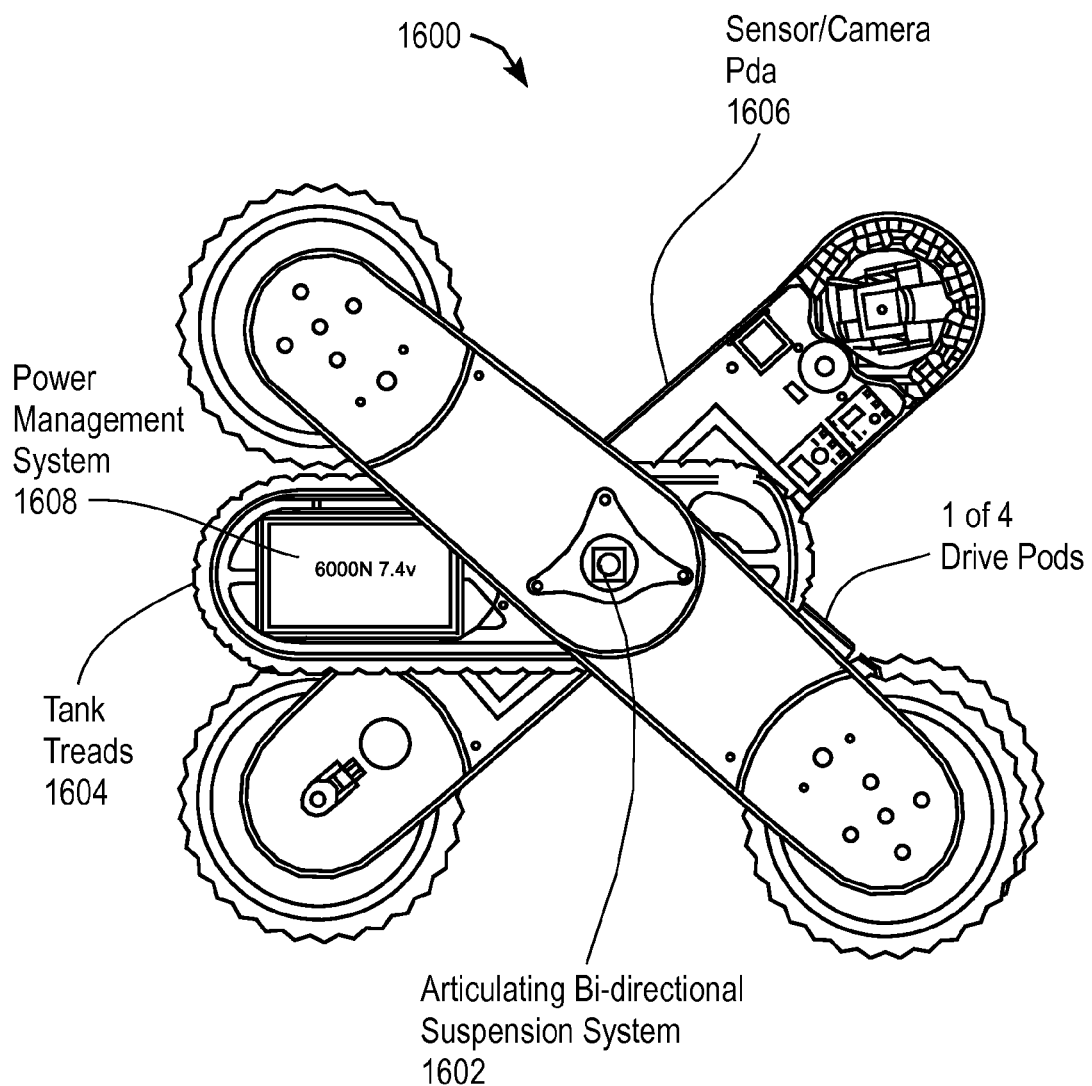
FIG. 16A-16D is a diagram of a rover for a brain-based device BBD.
Figure 16B:
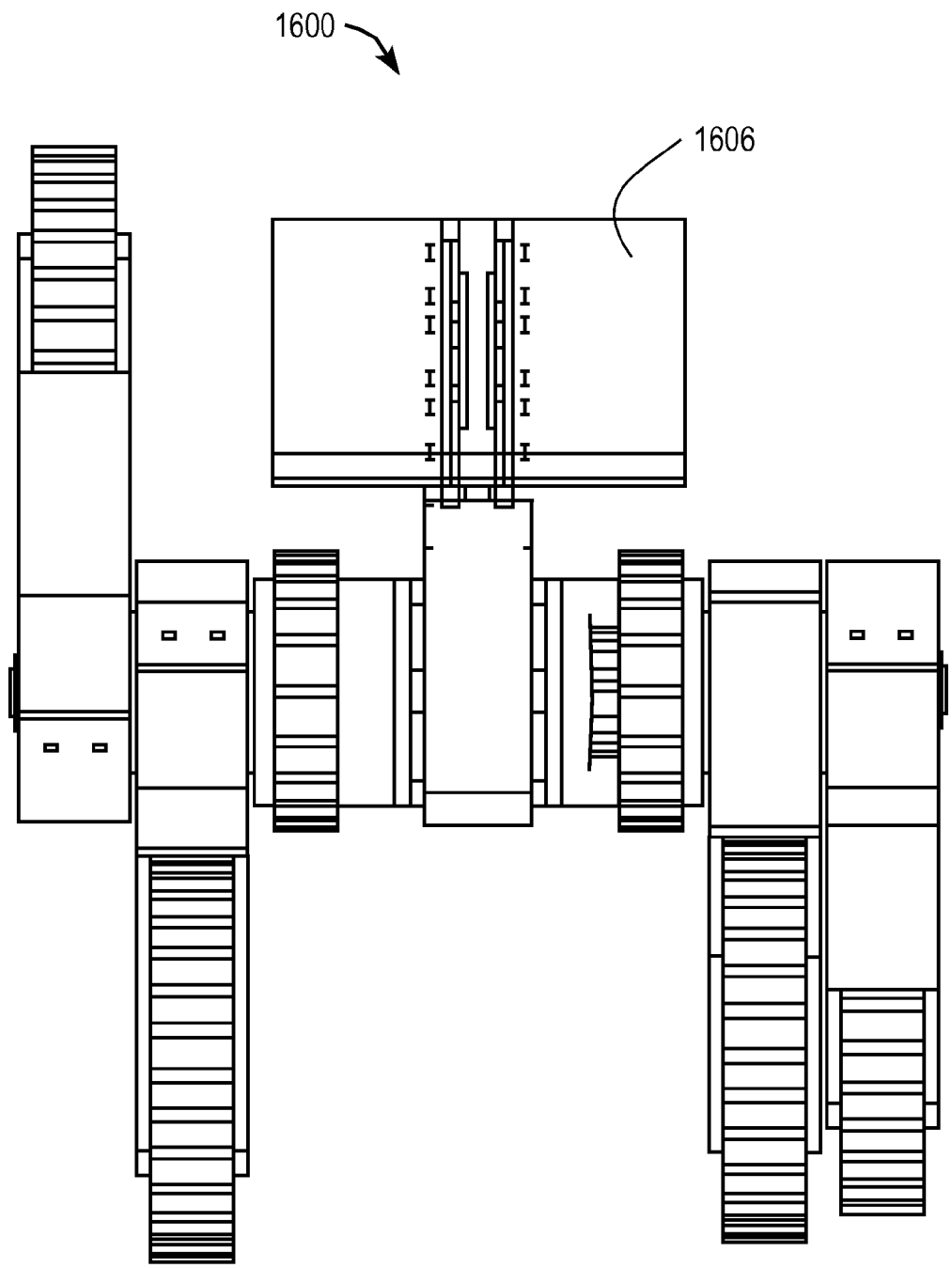
Figure 16C:
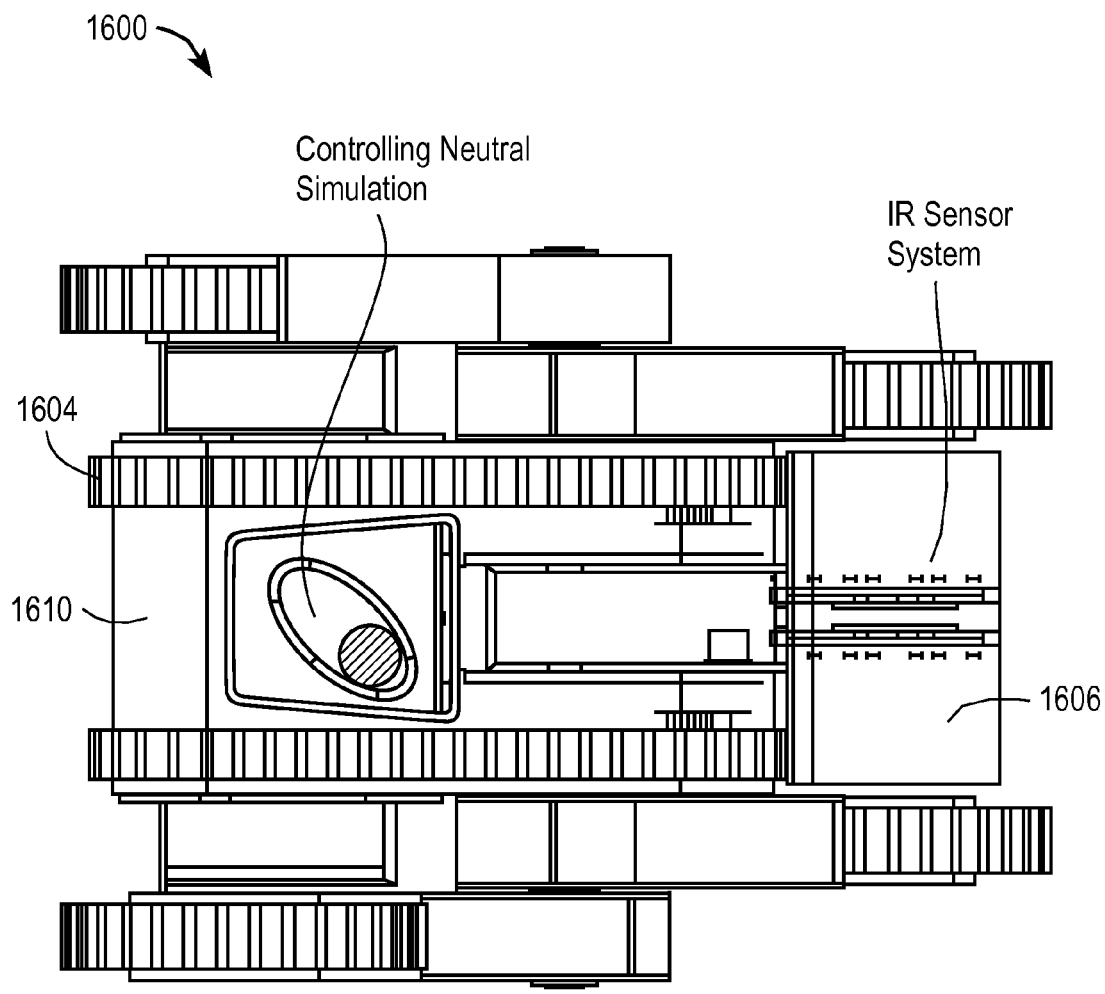
Figure 16D:
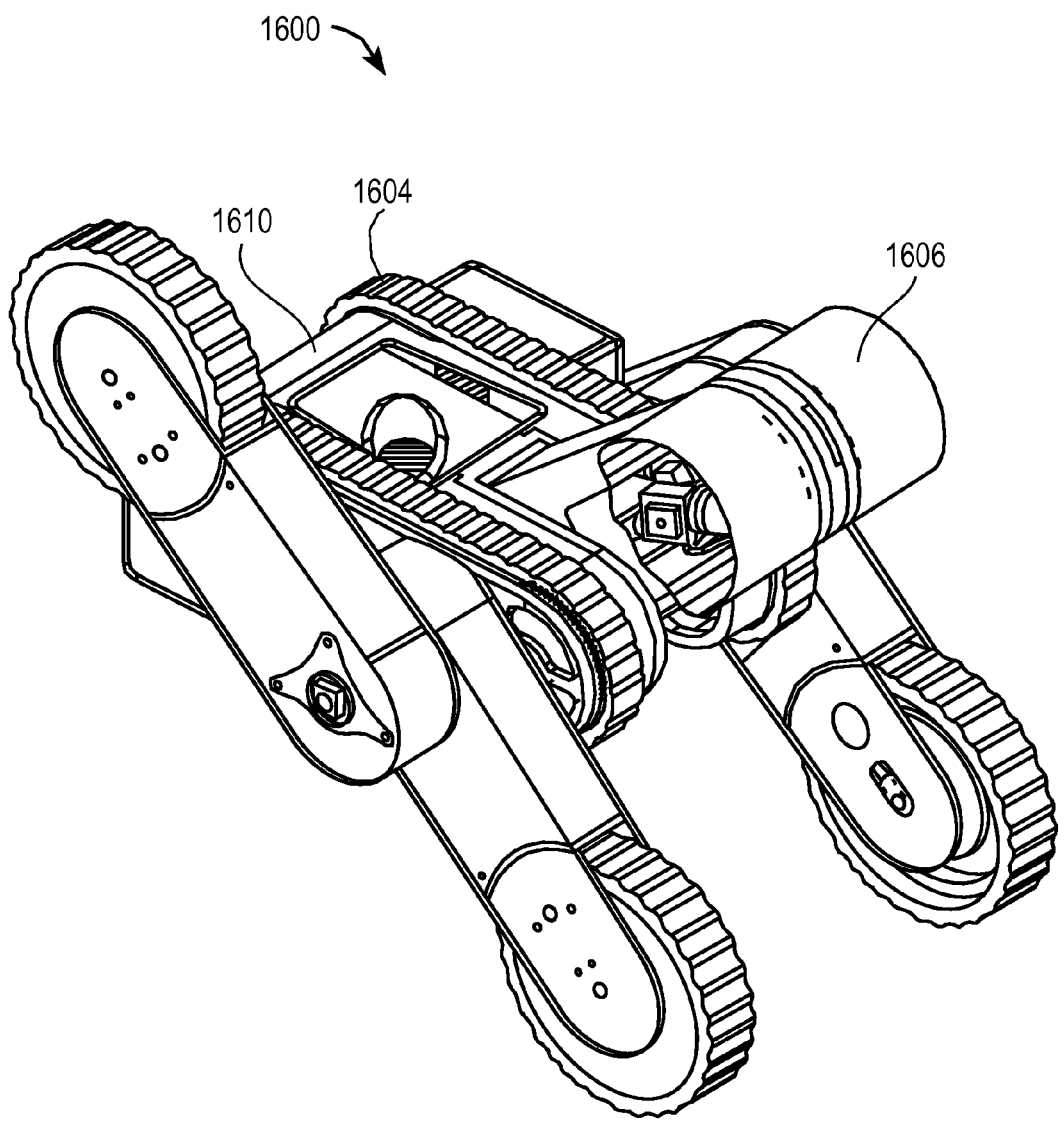

In the path, the data is received from the system bus and routed to the proper memory. The address can be applied to the system bus address lines to select the source. The address applied can be passed through a mux which would allow the processor sourced address to be applied in that mode. When addressed, the cores present their output data on the 32 bit system bus read data lines. The cores can be connected to the data lines in groups of 4, such that 1 of the 4 is tied to bits 0 to 7, the next to bits 8 to 15, the next to bits 16 to 24 and the fourth to bits 24 to 31. The 32 bit read data can be registered first. The data from the cores is either a weight bound for the SDRAM or a PSP output to be sent to the output storage table. Alternating registers take either the weight data or the OST data. The weight values are passed through a mux which selects between this data or the processor data and then on to the SDRAM, where a WRACK pulse cues the SDRAM controller to record the value into its FIFO. Since there is only 1 PSP output value (compared to 256 weight outputs), it can be handled more slowly. Each of the 4 bytes contained in the 32 bit data record can be individually written to the output storage table. The address for the output storage table is sequentially generated by the FSM controller and passed through a mux that would allow the processor address to be applied in that mode. The data for the output storage table is demuxed to byte size, registered and passed to the output storage table via a mux for the processor access as well. FIG. 15 shows an example of this system.

The SPP can receive programmed instructions, but more generally it can also receive inputs from sensors and have outputs to actuators. FIG. 16A-D shows an off-road capable robotic base ("rover") for a brain-based device (BBD). The rover can be a BBD that can navigate to a goal, via various waypoints, in an unknown, harsh, three-dimensional environment. The rover can give its controlling neural simulation a robust set of real-time inputs from numerous embedded sensors, together with adjustable effectors to enable controlled movements. These diverse connections with the neural simulation can help the BBD navigate in a novel environment. The rovers can be any size. The rover 1600 can have many unique features to provide maximum flexibility for operation of the neural simulation.

The rover 1600 can include multiple pods. The pods can be modular, extensible, interchangeable, and easily replaced. The pods and central unit can be connected through a central connector axis. In one embodiment, the rover can allow for the addition and subtraction of pods from the central connector axis and different sized central connector axes can be used. The central connector can include a conduit to send power, sensor and actuator signals to and from a central unit. The conduit can include a bus, such as a two-line bus, to allow a large number of sensors and actuators to communicate with the central unit. The pods can include sensors and actuators which interact with the neural model. Some of the pods can be drive pods including a wheel controlled by a motor.

The pods can have bi-directional suspension systems 1602. The bi-directional suspension can allow the pods to have a functional suspension system even when the rover is flipped over. The bi-directional suspension system can include gas charged shocks arranged in opposition to one another. The bi-directional suspension system can also include sensors to monitor the compression at each of the shocks.

In addition to wheels on some of the pods, the rover can include treads 1604, such as tank-type treads. The treads 1604 can be a part of a central unit. In one embodiment, the treads 1604 are not normally engaged. The treads 1604 can allow the rover 1600 to crawl out of an otherwise immobilizing situation. In most situations, the rover will be driving on terrain in which wheels are most efficient. However, on occasions where wheels are not viable, the rover can switch to using the treads 1604 to get out of difficult situations (e.g., climb out of a ravine). If the rover 1600 is stuck, the rover 1600 can move the pods such that the treads 1604 engage the ground. In one embodiment, the rover 1600 can move the pods to a fully extended position to allow the treads to engage the ground.

A sensor pod 1606, can house a camera and other sensors. The sensor pod 1606 can be constructed using some of the subassemblies used in the drive pods. In one embodiment, the sensor pod 1606 can be attached to the center portion 1610 that includes the treads 1604. The sensor pod can move to protect itself between the drive pods when the rover senses a freefall type situation.

The articulating drive and camera pods can provide the BBD with the ability to drive in an inverted orientation and increase the overall stability of the entire camera system. In one embodiment the pods can be rotated about a range of motion by motors at the pods.

The power management system 1608 can constantly monitor power consumption from its multiple power sources. In one embodiment, power management system 1608 includes sensors, such current sensors to measure the power consumed by motors and voltage sensors to measure the output of a battery.

Figure 17:
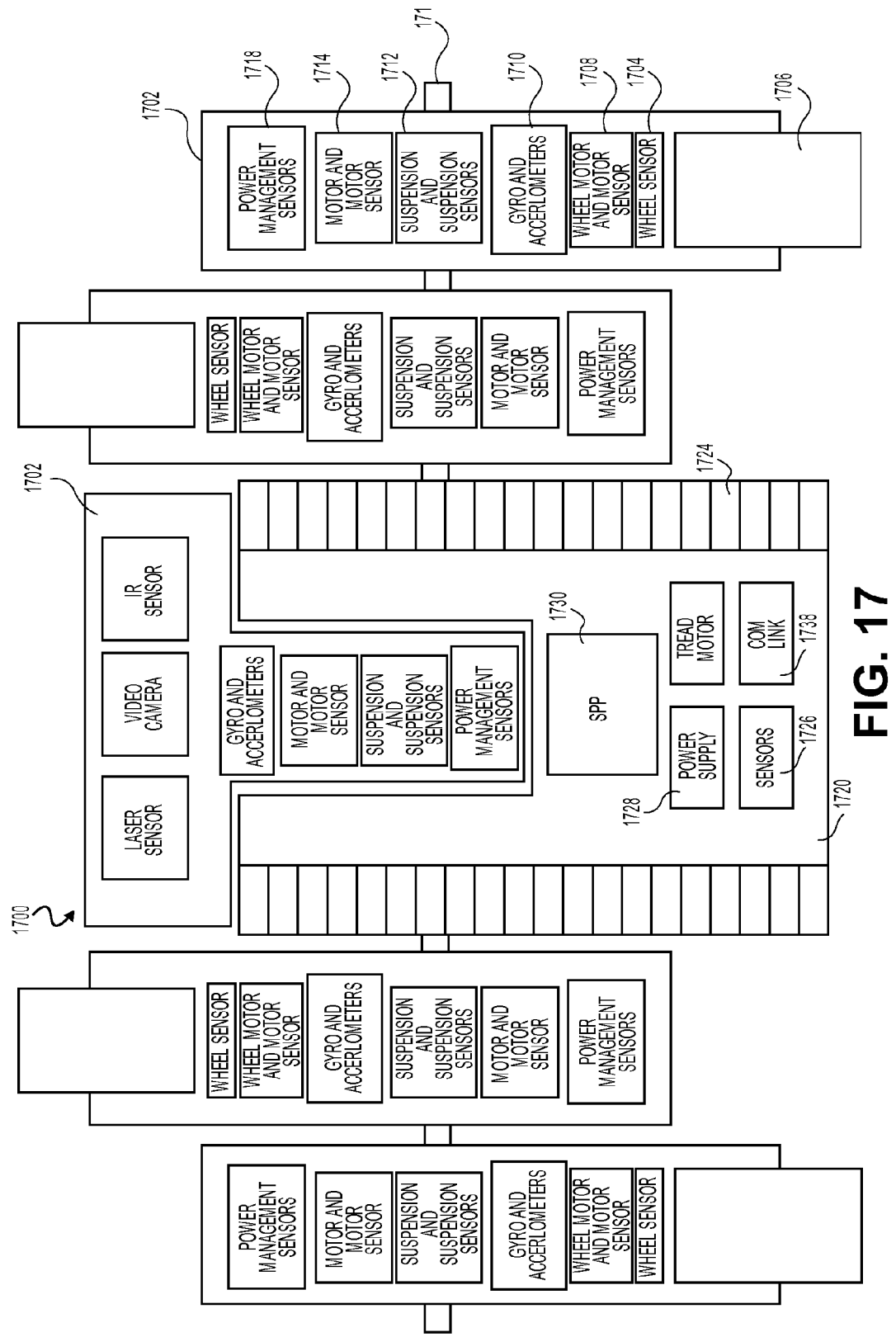
FIG. 17 is a functional diagram of a rover of one embodiment.

FIG. 17 is a functional diagram of an exemplary rover 1700. The rover 1700 can include drive pods, such as drive pod 1702. Drive pod 1702 can include a number of sensors and actuators. Wheel sensor 1704 can optically sense the position of the wheel 1706. The motor 1708, such as a brushless motor, can power the wheel 1706 and can include an associated motor sensor. A number of position sensors can be used such as gyros and accelerometers 1710. The suspension 1712, which can be a bi-directional suspension, can have associated sensors. The drive pod 1702 can have a motor 1714 and associated sensors for rotating the drive pod 1712 about the central axis 1716. The drive pod 1702 can include an associated power sensor 1718, at the drive pod 1702 or at the central unit 1720, to monitor the power consumption by the drive pod 1702. The sensor pod 1722 can include sensors such as a video camera, an IR sensor, a laser sensor or the like. The central unit 1720 can include treads 1724. The sensors 1726 can include tread position and tread motors sensors. The central unit 1720 can also include a power supply 1728, such as a battery.

The rover 1700 can be controlled by a neural model, such as a neural model run by SPP 1730, that receives sensor input and provides actuator outputs. The neural elements of the neural model can learn through the plasticity calculations how to react to situations in the environment. These plasticity calculations can modify the connection weights and thus the behavior of the neural model in response to inputs.

The behavior reactions are not explicitly programmed in by a programmer but instead learned by the BBD. The BDD can engage in unforeseen behavior as it reacts to the environment with the neural model. The neural model of rover 1700 can receive a large number of inputs from sensors and can learn by itself what inputs are the most relevant in different situations. For example stuck wheels can result in value type plasticity signals that inhibit the operation of behaviors that caused the stuck wheels. Smooth terrain as sensed by the video camera can be associated with good operation of the wheels and low power consumption and can thus result in positive learning. Rough terrain as sensed by the video camera can be associated with poor operation of the wheels and high power consumption and can thus result in inhibitory learning.

The neural model can include sensors and actuators in logical groupings. For example the response of the actuators to control output can be monitored by the sensors. In this way the BBD can learn to control its actions, with feedback, in a similar manner to the way animals learn to control the movements of their limbs.

The design or phenotype of the rover can be closely coupled with the neural simulation. Successful traversal over uneven terrain can use the neural model to monitor traction, rotation, and vibration sensors from the drive system and adjust the suspension compliance, speed of the wheels, and pod positions of the drive system to keep the rover moving efficiently over terrain. The cameras and other sensors, such as infrared and laser range finders, can feed into the neural model and allow the BBD to recognize a terrain and associate the near environment with a degree of difficulty. After experience, the BBD can learn to avoid areas of the environment that are difficult to traverse and seek areas where it can make efficient progress. A motor control loop, based on a model of cerebellar adaptation, can learn to keep the camera and sensor housing steady by moving the articulating pod appropriately due to terrain changes.

BBDs can adapt their behaviors based on environmental cues that trigger their value or reward system. The value system in the rover can be closely coupled with the power management system. Efficient use of power (or low current draw) is of positive value and high current draw is negative in value. Typically, an area where traction is poor or the surface is rough will draw more current than a smooth road. Therefore, the BBD, based on its value-dependent learning, can seek smooth, high traction surfaces when available.

The body of the rover can have room for computers, communication electronics, and batteries. Because of the number and bandwidth of the on-board sensors, the neural simulation of the BBD may have high performance computational requirements (such as a 32-node Beowulf cluster) The rover 1700 can include a corn link 1732 to wirelessly communicate with a neural model running remotely.

In an embodiment, in order to navigate over moderate to long distances, beyond the range of wireless communication, special onboard computing will be necessary. Conventional computers require too much power and are too large fit on an autonomous rover device. In one embodiment, a Special-Purpose Processor (SPP) 1730, such as that discussed above specifically designed for rapid and efficient computation of neural simulations can be used by the rover.

The neural simulation control running on an SPP, which is closely coupled with the unique, actively suspended rover design, can allow the BBD to complete its goals of traversing a novel environment, learning the salient objects and locations in the environment, and then using its experience to navigate in an efficient and reliable manner. The rover 1700 can also have override logic to protect the rover when the rover is in danger.

While embodiments of the invention have been described at times herein as being implemented using special-purpose processors and field programmable gate arrays, it should be understood that those examples have been provided only for purposes of illustration. The invention is not limited to those example implementations. As will be appreciated by persons skilled in the relevant art(s), embodiments of the invention can be implemented using any data processing/computing element, module, device or architecture. This includes, for example and without limitation, application specific integrated circuits (ASICs).

Figure 18:
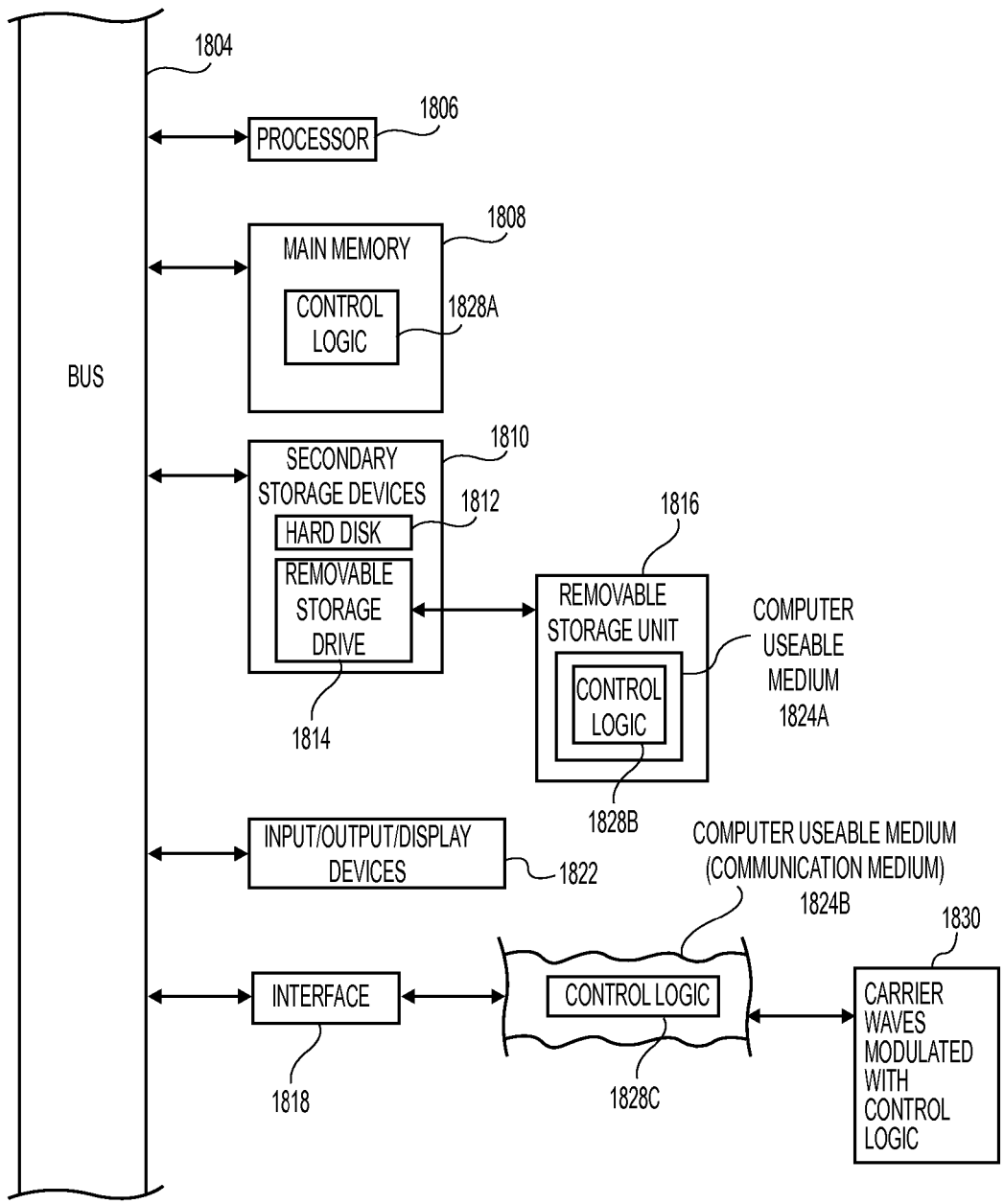
FIG. 18 is a data processing device or module useful for implementing the brain-based device functionality described herein, according to an embodiment of the invention.

In an embodiment, the present invention is implemented using one or more well known data processing devices or modules, such as a computer 1802 shown in FIG. 18. The computer 1802 includes one or more processors (also called central processing units, or CPUs), such as a processor 1806. The processor 1806 is connected to a communication bus 1804.

The computer 1802 also includes a main or primary memory 1808, such as random access memory (RAM). The primary memory 1808 has stored therein control logic 1828A (computer software), and data.

The computer 1802 also includes one or more secondary storage devices 1810. The secondary storage devices 1810 include, for example, a hard disk drive 1812 and/or a removable storage device or drive 1814. The removable storage drive 1814 represents a floppy disk drive, a magnetic tape drive, a compact disk drive, an optical storage device, tape backup, etc.

The removable storage drive 1814 interacts with a removable storage unit 1816. The removable storage unit 1816 includes a computer useable or readable storage medium 1824 having stored therein computer software 1828B (control logic) and/or data. Removable storage unit 1816 represents a floppy disk, magnetic tape, compact disk, DVD, optical storage disk, or any other computer data storage device. The removable storage drive 1814 reads from and/or writes to the removable storage unit 1816 in a well known manner.

The computer 1802 also includes input/output/display devices 1822, such as monitors, keyboards, pointing devices, etc.

The computer 1802 further includes a communication or network interface 1818. The network interface 1818 enables the computer 1802 to communicate with remote devices. For example, the network interface 1818 allows the computer 1802 to communicate over communication networks or mediums 1824B (representing a form of a computer useable or readable medium), such as LANs, WANs, the Internet, etc. The network interface 1818 may interface with remote sites or networks via wired or wireless connections.

Control logic 1828C may be transmitted to and from the computer 1802 via the communication medium 1824B. More particularly, the computer 1802 may receive and transmit carrier waves (electromagnetic signals) modulated with control logic 1830 via the communication medium 1824B.

Any apparatus or manufacture comprising a computer useable or readable medium having control logic (software) stored therein is referred to herein as a computer program product or program storage device. This includes, but is not limited to, the computer 1802, the main memory 1808, the hard disk 1812, the removable storage unit 1816 and the carrier waves modulated with control logic 1830. Such computer program products, having control logic stored therein that, when executed by one or more data processing devices, cause such data processing devices to operate as described herein, represent embodiments of the invention.

Accordingly, the brain-based device functionality described herein can be achieved in many ways, including but not limited to FPGAs, ASICs, special purpose processors, general purpose processors, computing elements, etc., and combinations thereof. The scope and spirit of the invention includes all of these embodiments.

Also, alternative embodiments of the invention may operate with virtual inputs and/or virtual outputs. For example, in certain embodiments, a BBD may operate with a virtual input received from a computer application (such as but not limited to a computer game) or other source, where such virtual input does not represent a real-world input from a real-world sensor. For example, instead of receiving input from the real-world haptic, olfactory, audio, acoustic, thermal, visual, and/or auditory sensors described above, a BBD embodiment can receive input from a computer application (or other source) that simulates such haptic, olfactory, audio, acoustic, thermal, visual, and/or auditory sensors. Also, instead of interacting with real-world actuators, such as effectors or wheels for movement, a BBD embodiment can interact with virtual actuators, such as virtual wheels that are part of a virtual rover. Accordingly, the description above of the rover is provided for purposes of illustration, not limitation. For example, alternative BBD embodiments can be part of virtual rovers that are simulated by computer applications, wherein BBDs send output to virtual actuators.

The invention can work with software, hardware, and/or operating system implementations other than those described herein. Any software, hardware, and operating system implementations suitable for performing the functions described herein can be used.

The foregoing description of preferred embodiments of the present invention has been provided for the purposes of illustration and description. It is not intended to be exhaustive or to limit the invention to the precise forms disclosed. Many modifications and variations will be apparent to one of the ordinary skill in the relevant arts. The embodiments were chosen and described in order to best explain the principles of the invention and its partial application, thereby enabling others skilled in the art to understand the invention for various embodiments and with various modifications that are suited to the particular use contemplated. It is intended that the scopes of the invention are defined by the claims and their equivalents.

APPENDIX I

```
Void neural_core(void)
{
    unsigned byte       I;                  // this index is used in many places
    //
    signed 16bit word   A;                  // accumulator for input_data*weight
    unsigned byte       input_data[256];    // these values are read from DRAM at
    signed byte         weight[256];        // run time and are unique for each
    //                                      // element but are not stored locally
    //                                      // between epochs
    //
    signed 16bit word   temp;               // temp variable
    unsigned byte       old_S;              // this is unique for each element and
                                            // is stored locally
    unsigned byte       S;                  //  this is the PSP which is propagated
                                            // but not stored except as Old_S
```

APPENDIX I-continued

```
bit              send_enabled;       // this is a bit set by the memory
                                     // controller to enable PSP data to be sent
constant 3bits   w;                  // this is a divisor which is applied to
                                     // Old_S. It is unique to each Core
constant unsigned byte g;            // this is a scale multiplier applied
                                     // A and is unique to each Core
unsigned byte    Tan_Lut[ ] =        // this is the Tanh lookup and is
                 0,1,2,3,4...256;    // unique to each core
unsigned byte    Phi_Threshold;      // unique to each core
//
signed byte      Fn_Lut[ ] =         // unique to each core
                 −100,−99,−98...130;
signed byte      E;                  // this is the decay constant that
                                     // is unique to each core
unsigned byte    Original_Weight;    // this will either be one variable per
                                     // element or an array per core
unsigned byte    Value_term;         // index of our value table
unsigned byte    Value_max;          // max number of value table
unsigned byte    Value_table[ ] =    // table applied over succesive
                 0,1,2,3,4,3,2,1,0;  // epochs
signed byte      C;                  // temp variable for weight calculation
bit              Value_Enabled;      // this bit is set by the value system
//
unsigned 32bit word connection_table[256]; // these are unique for each element
                                     // they are loaded into BRAM from DRAM
unsigned byte    element;            // this is the element index
//
// loop through the 256 elements per core
for(element = 0;element<=255;element++)
{
   Read_in_weights_from_DRAM(element[&weight]);
   Read_in_input_data_from_DRAM(element[&weight]);
   Read_in_connection_table_from_DRAM(element[&weight]);
   //
   ////////////////////////////////////
   //     this is the pre-synaptic activity
   //     or neuronal activity
   //
   ////////////////////////////////////
   A = 0;
   for(I = 0;I<=255;I++)
   {
      A += input_data[I]*weight[I];
   }
   //
   ////////////////////////////////////
   //     this is the post-synaptic activity
   //
   //
   ////////////////////////////////////
   temp = A*g;
   temp += old_S[element]>>w;
   //
   here we need to adjust a 16 bit 'temp' to be an 8 bit value
   for now we just save the top 8 bits so we get
   temp = temp>>8;
   //
   S = 0;
   if(temp >= Phi_Threshold)
   {
      S = Tan_Lut[temp];
   }
   old_S[element] = S;
   Send_PSP_data(S);
   //
////////////////////////////////////
   //     this is activity-dependant synaptic plasticity
   //     with provisions for value plasticity
   //
////////////////////////////////////
   // the learning rule with value added in
   temp = Fn_Lut[S];
   if(Value_Enabled)
   {
      temp = temp * Value_table[Value_term]
   }
   if(++Value_term > Value_max)
   {
```

APPENDIX I-continued

```
        Value_term = 0;
        Value_Enabled = 0;
    }
    //
    for(I= 0;I<255;I++)
    {
        C = weight[I] – E;          // this is the forgetting rule
        if(C < Original_Weight[element]) //
        {                            //
            C = Original_Weight[element]; //
        }
        weight[I] = C + temp;        // new weight to be stored
    }
    Write_out_new_weights_to_DRAM(&weight);
   }
}
////////////////////////////////////////////////////////////////////
void Write_out_new_weights_to_DRAM(signed byte &weight)
{
    for(I = 0;I<=255;I++)
    {
        write(element[weight[I]]);
    }
}
////////////////////////////////////////////////////////////////////
void Send_PSP_data(unsigned byte S)
{
    while(!send_enabled)
    {
        // wait for our signal to send
    }
    for(I = 0;I<=255;I++)
    {
        send(concatenate(connection_table[I],S));
    }
}
```

APPENDIX II

In one exemplary embodiment with 256 cores and 256 timeslices, the weights can use a single signed byte with:
256 bytes per element=>256 bytes
256 timesliced elements per core=>256*256=65536 bytes
256 cores per chip=>256^3=16,777,216 bytes
(16 Meg by 8) total The PSP output data can each have a single unsigned byte with:
256 bytes per element=>256 bytes
256 timesliced elements per core=>256*256=65536 bytes
256 cores per chip=>256^3=16,777,216 bytes
(16 Meg by 8) total The connection table can have 16 bits for each connection. 8 bits for destination neural core ID, and 8 bits for destination timeslice ID. Thus:
256 connections per element=>2*256=516 bytes
256 timesliced elements per core=>2*256^2 connection bytes
256 cores per chip=>$_{2*256^3}$ connection bytes
(16 Meg by 16) total

What is claimed is:

1. A special purpose processor for implementing a synthetic neural model of the biological anatomy of the human brain to control a brain-based device (BBD) movable in a real world environment, in which the synthetic neural model and processing by the special purpose processor are based on biological principles of the human brain, comprising:

(a) a plurality of neural processing units, each one of said neural processing units having (i) a programmed processor, and (ii) a local memory, in which
  (i) said programmed processor of said one neural processing unit processes data corresponding to a plurality of distinct neural elements, and in which each of said plurality of distinct neural elements has a plurality of pre-synaptic inputs received from outputs of other neural elements and an output providing post-synaptic output activity data to be sent to other neural elements; and
  (ii) said local memory stores a plurality of data records, each one of said data records having data corresponding to one of said neural elements of said one of said neural processing units, in which said data of said one data record stores (a) a synaptic connection table defining synaptic connections between one of said neural elements and other of said neural elements, (b) a current weight data table having weight data corresponding to each said synaptic connection through which said one neural element receives an input, and (c) an output storage table having post-synaptic output activity data resulting from processing by said one neural processing unit and provided on said output;

(b) first system memory storing an output storage table having post-synaptic output activity data corresponding to each said output of each said neural element of each of said plurality of neural processing units;

(c) second system memory for storing respective data records for each of said plurality of neural elements for each of said plurality of neural processing units, each of said data records having address pointers to said first system memory to access and output post-synaptic output activity data stored in said output storage table;

(d) a finite state machine for controlling writing of the post-synaptic output activity data into said output storage table from said plurality of neural processing units and for reading the post-synaptic output activity data stored in said output storage table in response to said address pointers from said second system memory;

(e) a system data bus for transferring data between said plurality of neural processing units and said first system memory and said second system memory;

(f) sensors for receiving and providing sensed data corresponding to the real-world environment in which the BBD moves, wherein said plurality of neural processing units process said sensed data to calculate said weight data; and (g) actuators, responsive to the data processed by said plurality of neural processing units, for controlling movement of the BBD in the real-world environment; and (h) wherein (i) said plurality of neural processing units process data for all of said plurality of neural elements over a given time epoch and (ii) during said given time epoch, said output storage table and said current weight table are accessed to provide said post-synaptic output data and said current weight data for one neural element of the same neural processing unit.

2. A special purpose processor according to claim 1, wherein the epoch comprises a plurality of time slices, and during a given time slice of an epoch:

(a) one of said plurality of neural processing units sends current weight data corresponding to all the inputs of one neural element to said current weights table of said second system memory; and (b) another of said neural processing units sends its post-synaptic output activity data of one of its neural elements to said output storage table of said first system memory.

* * * * *